(12) United States Patent
Yin

(10) Patent No.: US 10,895,312 B2
(45) Date of Patent: Jan. 19, 2021

(54) HYDROKINETIC TORQUE-COUPLING DEVICE HAVING LOCK-UP CLUTCH WITH DUAL PISTON ASSEMBLY

(71) Applicant: VALEO KAPEC CO., LTD., Daegu (KR)

(72) Inventor: Xuexian Yin, Troy, MI (US)

(73) Assignee: Valeo Kapec Co., Ltd., Daegu (KR)

( * ) Notice: Subject to any disclaimer, the term of this patent is extended or adjusted under 35 U.S.C. 154(b) by 146 days.

(21) Appl. No.: 16/284,918

(22) Filed: Feb. 25, 2019

(65) Prior Publication Data

US 2020/0049245 A1 Feb. 13, 2020

Related U.S. Application Data

(60) Provisional application No. 62/717,563, filed on Aug. 10, 2018.

(51) Int. Cl.
| | |
|---|---|
| *F16H 45/02* | (2006.01) |
| *B60K 6/387* | (2007.10) |
| *F16D 25/0635* | (2006.01) |

(52) U.S. Cl.
CPC ............ *F16H 45/02* (2013.01); *B60K 6/387* (2013.01); *F16D 25/0635* (2013.01); *B60Y 2200/92* (2013.01); *F16H 2045/0294* (2013.01)

(58) Field of Classification Search
CPC ................... F16H 2045/002; F16H 2045/0273–2045/0294; F16H 2045/0205–021
See application file for complete search history.

(56) References Cited

U.S. PATENT DOCUMENTS

| | | |
|---|---|---|
| 5,348,127 A | 9/1994 | Murata et al. |
| 5,782,326 A | 7/1998 | Souza |
| (Continued) | | |

FOREIGN PATENT DOCUMENTS

JP    2009036376 A    2/2009

OTHER PUBLICATIONS

International Search Report dated Nov. 18, 2019 from corresponding International Application No. PCT/KR2019/009657 filed Aug. 2, 2019 in the name of Valeo Kapec Co., Ltd.

*Primary Examiner* — Ernesto A Suarez
*Assistant Examiner* — Lillian T Nguyen
(74) *Attorney, Agent, or Firm* — Berenato & White, LLC

(57) ABSTRACT

A hydrokinetic torque-coupling device for a hybrid electric vehicle, comprising a casing rotatable about a rotational axis, a torque converter including an impeller wheel and a turbine wheel, a lockup clutch including a dual piston assembly, and a selective clutch disposed outside of the casing. The selective clutch includes an input member and an output member non-rotatably mounted to the casing. The dual piston assembly includes a main piston and at least one secondary piston mounted to the main piston and axially moveable relative thereto. The main piston is selectively axially moveable relative to the casing and the at least one secondary piston between a lockup position and a non-lockup position. The output member is selectively axially moveable relative to the input member between an engaged position and a disengaged position. The output member selectively is axially moveable by action of the at least one secondary piston.

22 Claims, 28 Drawing Sheets

(56) References Cited

U.S. PATENT DOCUMENTS

| | | | |
|---|---|---|---|
| 5,992,589 A * | 11/1999 | Fukushima | F16H 45/00 |
| | | | 192/3.29 |
| 8,387,764 B2 | 3/2013 | Heeke | |
| 2008/0169165 A1 | 7/2008 | Samie et al. | |
| 2010/0025175 A1 | 2/2010 | Verhoog et al. | |
| 2012/0021869 A1* | 1/2012 | Robinette | F16D 21/06 |
| | | | 477/6 |
| 2013/0035202 A1* | 2/2013 | Ideshio | B60K 6/46 |
| | | | 477/5 |
| 2013/0291528 A1* | 11/2013 | Strong | F16F 15/1236 |
| | | | 60/341 |
| 2015/0323018 A1 | 11/2015 | Hemphill et al. | |
| 2016/0116042 A1 | 4/2016 | Depraete | |
| 2017/0326965 A1 | 11/2017 | Lahr et al. | |
| 2018/0178778 A1 | 6/2018 | Lahr et al. | |

\* cited by examiner

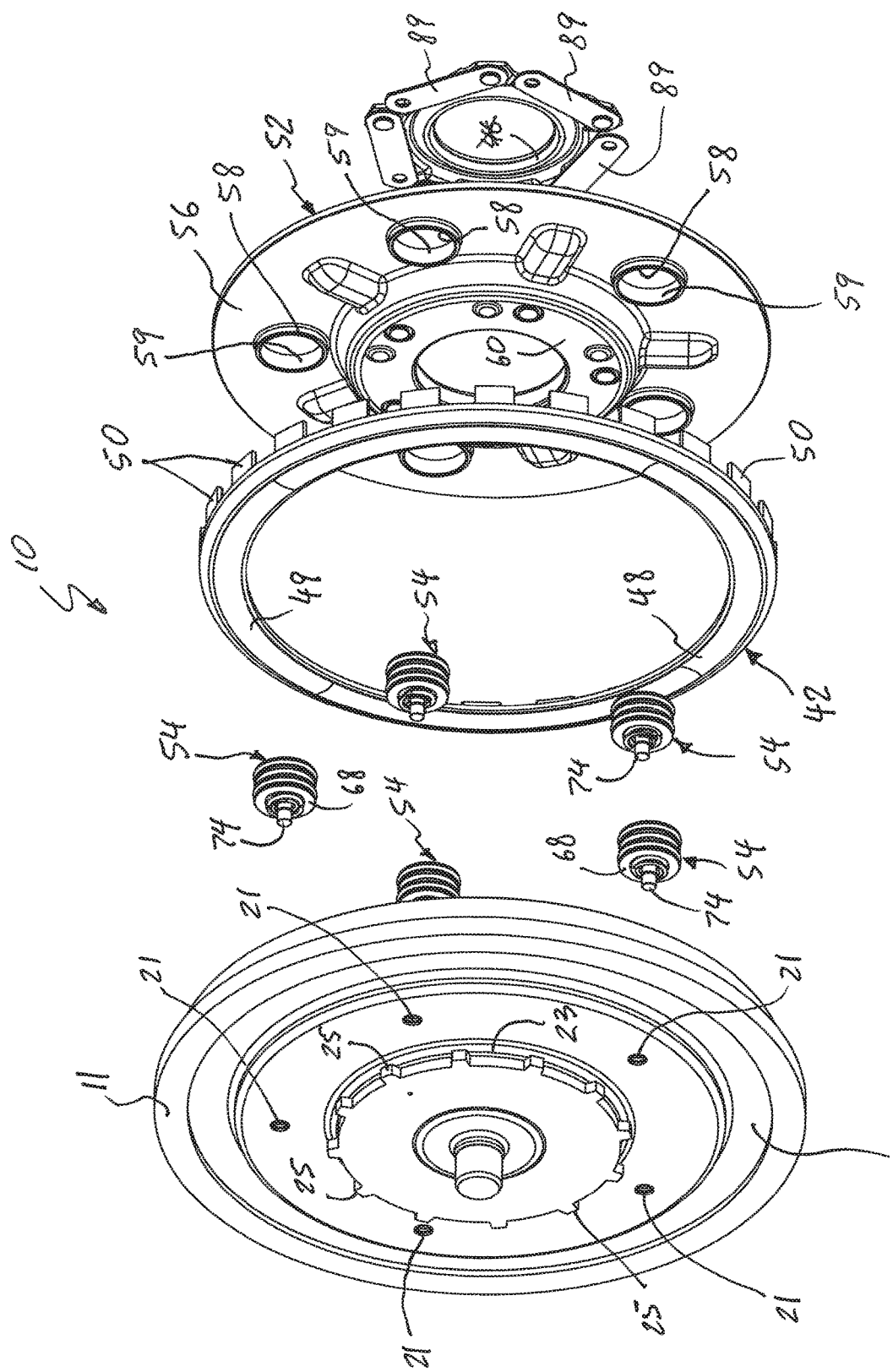

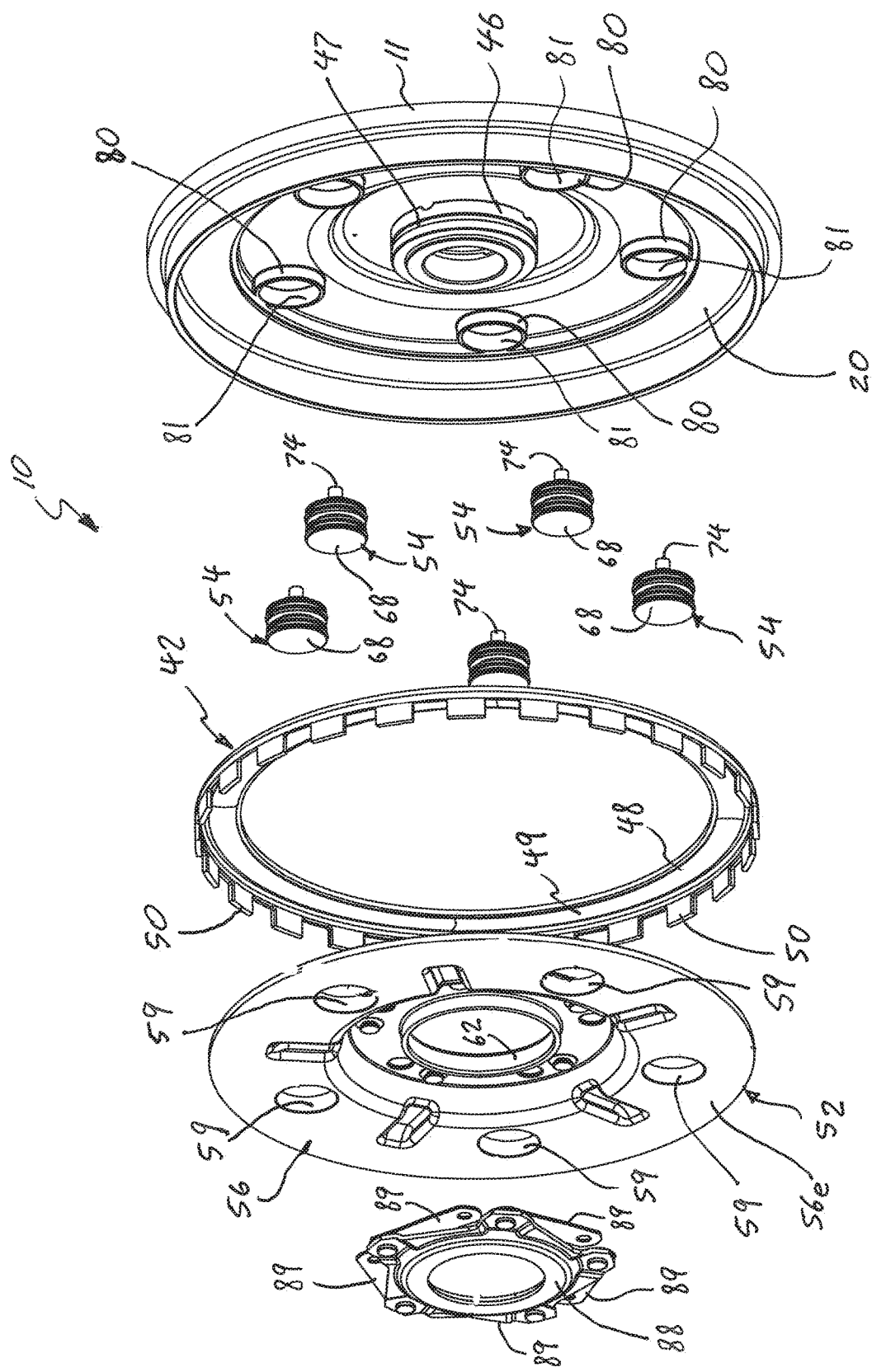

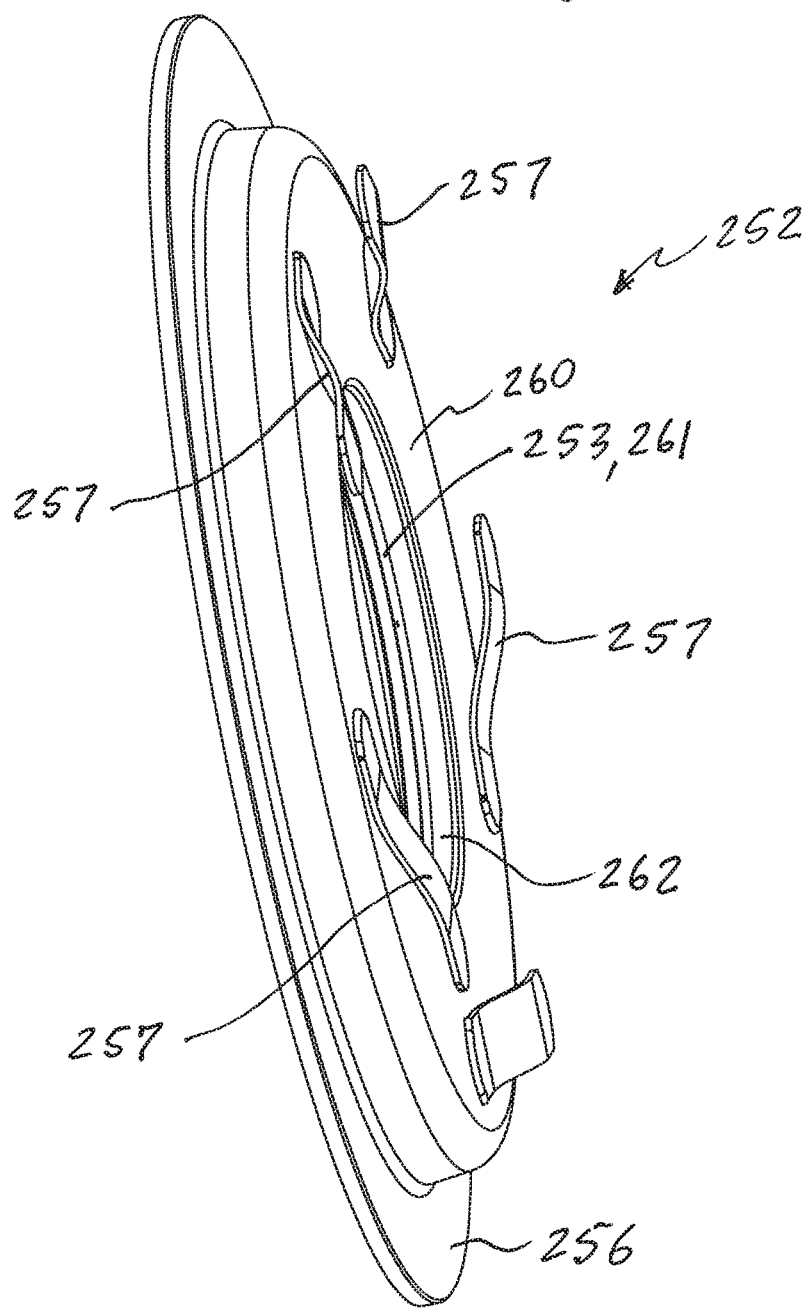

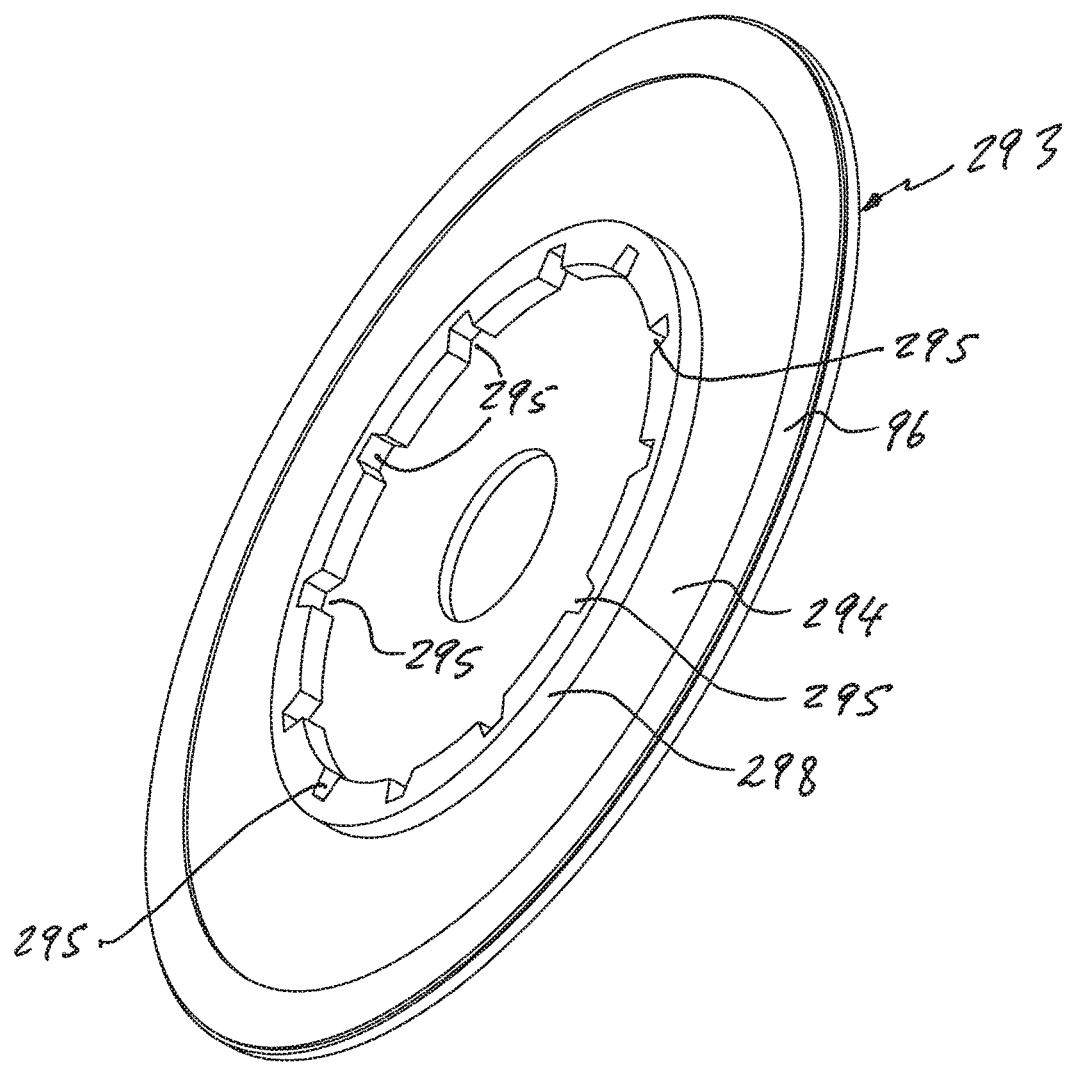

HYDROKINETIC TORQUE-COUPLING DEVICE HAVING LOCK-UP CLUTCH WITH DUAL PISTON ASSEMBLY

CROSS-REFERENCE TO RELATED APPLICATIONS AND CLAIM TO PRIORITY

This application is related to Provisional Application No. 62/717,563 filed Aug. 10, 2018, the disclosure of which is incorporated herein by reference and to which priority is claimed.

FIELD OF THE INVENTION

This invention generally relates to fluid coupling devices, and more particularly to a hydrokinetic torque-coupling device for a vehicle hybrid powertrain system having a lock-up clutch with a dual piston structure, and a method of making the same.

BACKGROUND OF THE INVENTION

Known hybrid powertrain systems include an internal combustion engine and an electric motor/generator that are coupled to a vehicle transmission to transfer torque to a driveline for tractive effort. Known electric motor/generators are supplied electric power from energy storage systems, such as electric batteries. Hybrid powertrain systems may operate in various modes to generate and transfer propulsion power to vehicle wheels.

While hybrid powertrain systems, including but not limited to those discussed above, have proven to be acceptable for vehicular driveline applications and conditions, improvements that may enhance their performance and cost are possible.

BRIEF SUMMARY OF THE INVENTION

According to an aspect of the invention, there is provided a hydrokinetic torque-coupling device for a hybrid electric vehicle, comprising a casing rotatable about a rotational axis, a torque converter including an impeller wheel and a turbine wheel disposed in the casing coaxially with the impeller wheel, a lockup clutch including a dual piston assembly and being switchable between a hydrodynamic transmission mode, in which the turbine wheel is rotatable relative to the casing, and a lockup mode, in which the turbine wheel is non-rotatably coupled to the casing, and a selective clutch disposed outside of the casing. The selective clutch includes an input member and an output member non-rotatably mounted to the casing. The dual piston assembly includes a main piston and at least one secondary piston mounted to the main piston and axially moveable relative to the main piston and the casing. The main piston of the dual piston assembly is selectively axially moveable relative to the casing and the at least one secondary piston between a lockup position, in which the main piston is non-rotatably coupled to the casing, and a non-lockup position, in which the main piston is rotatable relative to the casing. The output member is selectively axially moveable relative to the input member between an engaged position, in which the output member is non-rotatably coupled to the input member of the selective clutch, and a disengaged position, in which the output member is rotatable relative to the input member of the selective clutch. The output member is selectively axially moveable from the engaged position to the disengaged position of the selective clutch by action of the at least one secondary piston.

Other aspects of the invention, including apparatus, devices, systems, converters, processes, and the like which constitute part of the invention, will become more apparent upon reading the following detailed description of the exemplary embodiments.

BRIEF DESCRIPTION OF THE SEVERAL VIEWS OF THE DRAWING(S)

FIG. 3 is an exploded perspective view from the rear of the lock-up clutch with a dual piston assembly and a cover shell in accordance with the first exemplary embodiment of the present invention;

FIG. 4 is an exploded perspective view from the front of the lock-up clutch with the dual piston assembly and the cover shell in accordance with the first exemplary embodiment of the present invention;

FIG. 22 is a perspective view of a main piston of a dual piston assembly in accordance with the third exemplary embodiment of the present invention;

FIG. 27 is a perspective view of an output member of the selective clutch in accordance with the third exemplary embodiment of the present invention.

Figure 1:
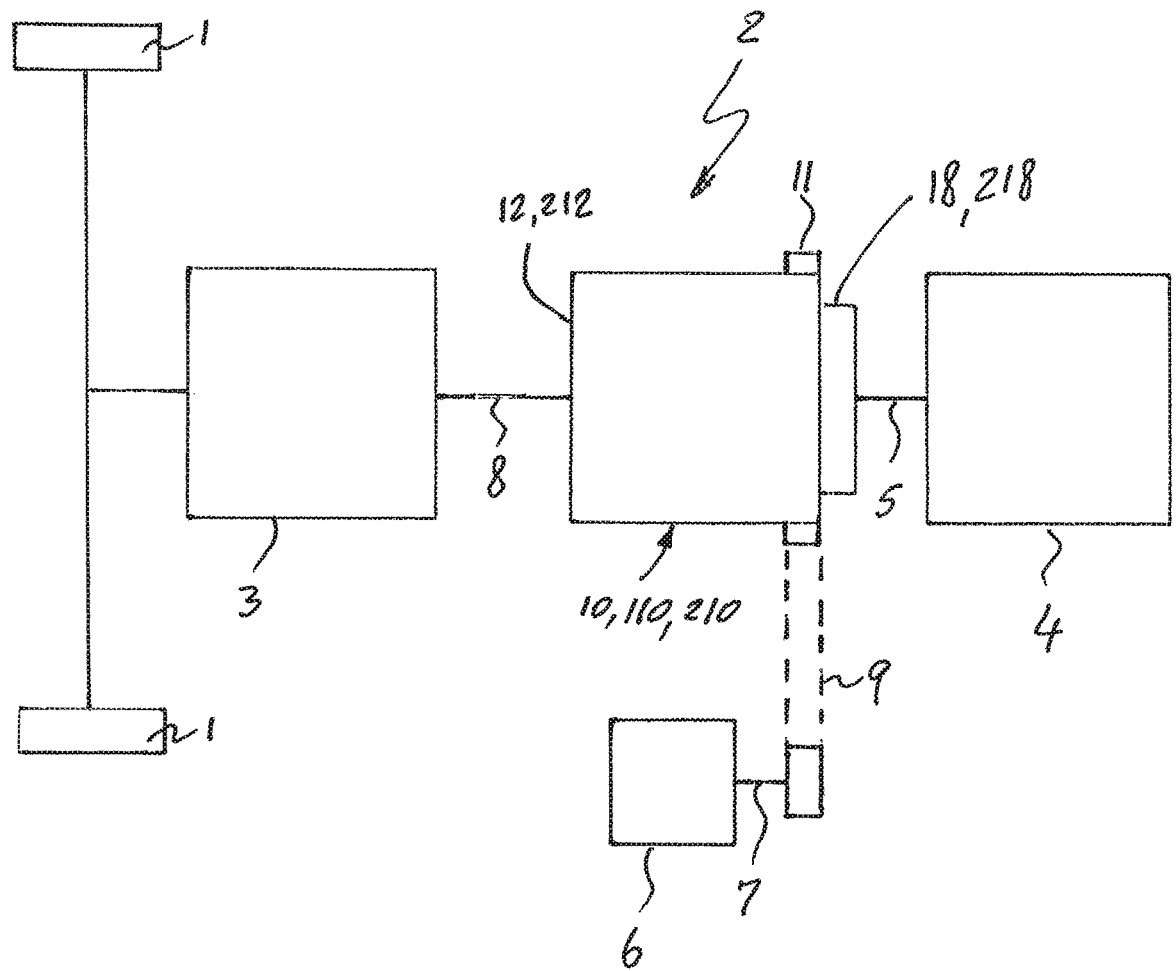
FIG. 1 is a schematic view of a hybrid powertrain system in accordance with the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the words "a" and "an" as used in the claims means "at least one" and the word "two" as used in the claims means "at least two". For the purpose of clarity, some technical material that is known in the related art has not been described in detail in order to avoid unnecessarily obscuring the disclosure.

FIG. 1 shows a schematic view of a hybrid powertrain system 2 of a hybrid motor vehicle in accordance with the present invention. The hybrid powertrain system 2 comprises multiple torque-generating devices including an internal combustion engine (ICE) 4 and at least one rotary electric machine (such as motor, generator or motor/generator) 6. The ICE 4 and the electric machine 6 are mechanically coupled via a hydrokinetic torque-coupling device 10 and a transmission 3 to transfer propulsion power to vehicle wheels 1. The hydrokinetic torque-coupling device 10 of the present invention may be employed in any suitable powertrain configuration that includes the internal combustion engine 4 and the electric machine 6 coupled via the hydrokinetic torque-coupling device 10 and the transmission 3. The hybrid powertrain system 2 may be employed in vehicles including, but not limited to, passenger vehicles, light-duty or heavy-duty trucks, utility vehicles, agricultural vehicles, industrial/warehouse vehicles, recreational off-road vehicles, etc.

The hybrid powertrain system 2 is configured so that the ICE 4 and the electric machine 6 are mechanically coupled to the transmission 3 employing the hydrokinetic torque-coupling device 10.

Figure 2A:
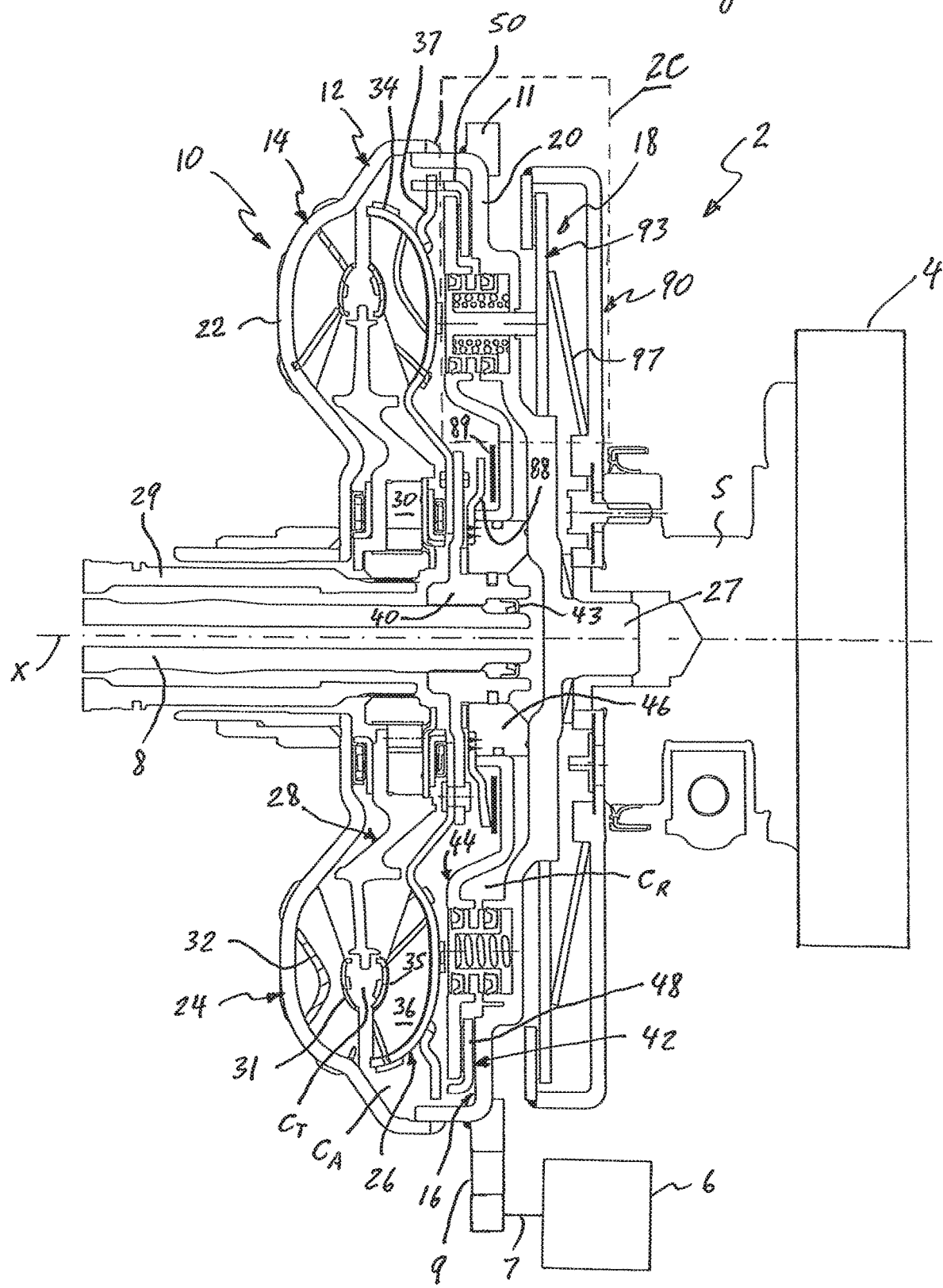
FIG. 2A is a sectional view of a hydrokinetic torque-coupling device in accordance with a first exemplary embodiment of the present invention in a first mode of operation.

The hydrokinetic torque-coupling device in accordance with a first exemplary embodiment of the present invention is generally represented in the accompanying drawings by reference numeral 10, as best shown in FIG. 2A. The hydrokinetic torque-coupling device 10 is intended to couple first and/or second driving shafts to a driven shaft, for example in the hybrid powertrain system 2 of the hybrid motor vehicle. In this case, the first driving shaft is an output shaft (such as a crankshaft) 5 of the ICE 4 of the hybrid motor vehicle, and the second driving shaft is an output shaft 7 of the rotary electric machine 6, as best shown in FIG. 2A. The driven shaft is an input shaft 8 of a transmission (or gearbox) 3 of the hybrid motor vehicle, as shown in FIG. 2A. Thus, the hydrokinetic torque-coupling device 10 is intended to couple the ICE 4 of the hybrid motor vehicle and/or the rotary electric machine 6 to the driven shaft 8.

The hydrokinetic torque-coupling device 10 includes a sealed casing 12 filled with a fluid, such as oil or transmission fluid, and rotatable about a rotational axis X, a hydrokinetic torque converter 14, a lock-up clutch 16, and a selective clutch 18. Hereinafter the axial and radial orientations are considered with respect to the rotational axis X of the torque-coupling device 10. As best shown in FIG. 2A, the lock-up clutch 16 is disposed in the casing 12, while the selective clutch 18 is disposed outside of the casing 12.

The sealed casing 12, the torque converter 14, the lock-up clutch 16 and the selective clutch 18 are all rotatable about the rotational axis X. As is known in the art, the torque-coupling device 10 is generally symmetrical about the rotational axis X. Hereinafter the axial and radial orientations are considered with respect to the rotational axis X of the torque-coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 2A includes a first shell (or cover shell) 20, and a second shell (or impeller shell) 22 disposed coaxially with and axially opposite to the first shell 20. The first and second shells 20, 22 are non-movably (i.e., fixedly) interconnected and sealed together about their outer peripheries, such as by weld 13. Each of the first and second shells 20, 22 are integral or one-piece and may be made, for example, by press-forming one-piece metal sheets.

The first shell 20 is selectively drivingly connectable to the driving shaft, typically to the output shaft 5 of the ICE 4 through the selective clutch 18. Specifically, in the illustrated embodiment of FIG. 2A, the casing 12 is selectively rotatably driven by the ICE 4 and is selectively drivingly coupled to the driving shaft 5 through the selective clutch 18.

Furthermore, the cover shell 20 is drivingly (non-rotatably) connected to the output shaft 7 of the rotary electric machine 6 through a sprocket (or a ring gear) 11, which is non-movably (i.e., fixedly) connected to the cover shell 20 (such as by welding or other appropriate means), and a continuous belt 9 (or a pinion gear), so that the casing 12 turns at the same speed at which the rotary electric machine 6 operates for transmitting torque.

The torque converter 14 includes an impeller wheel (sometimes referred to as the pump, impeller assembly or impeller) 24, a turbine wheel (sometimes referred to as the turbine assembly or turbine) 26, and a stator (sometimes referred to as the reactor) 28 interposed axially between the impeller wheel 24 and the turbine wheel 26. The impeller wheel 24, the turbine wheel 26, and the stator 28 are coaxially aligned with one another and the rotational axis X. The impeller wheel 24, the turbine wheel 26, and the stator 28 collectively form a torus. The impeller wheel 24 and the turbine wheel 26 may be fluidly coupled to one another in operation as known in the art. In other words, the turbine wheel 26 is hydro-dynamically drivable by the impeller wheel 24.

The impeller wheel 24 includes the impeller shell 22, an annular impeller core ring 31, and a plurality of impeller blades 32 fixedly (i.e., non-moveably) attached, such as by brazing, to the impeller shell 22 and the impeller core ring 31. The impeller shell 22 is an integral (or unitary) component, e.g., made of a single part or separate components fixedly connected together.

The turbine wheel 26, as best shown in FIG. 2A, includes an annular, semi-toroidal (or concave) turbine shell 34 rotatable about the rotational axis X, an annular turbine core ring 35, and a plurality of turbine blades 36 fixedly (i.e., non-moveably) attached, such as by brazing, to the turbine shell 34 and the turbine core ring 35. The turbine shell 34, the turbine core ring 35 and the turbine blades 36 are conventionally formed by stamping from steel blanks. The impeller shell 22 and the turbine shell 34 collectively define a toroidal inner chamber (or torus chamber) CT therebetween.

The stator 28 is positioned between the impeller wheel 24 and the turbine wheel 26 to redirect fluid from the turbine wheel 26 back to the impeller wheel 24 in an efficient manner. The stator 28 is typically mounted on a one-way (or overrunning) clutch 30 to prevent the stator 28 from counter-rotating.

The turbine wheel 26 is non-rotatably secured to a turbine (or output) hub 40 by appropriate means, such as by rivets, threaded fasteners or welding. The turbine hub 40 is non-rotatably splined to the driven shaft 8. The turbine hub 40 is rotatable about the rotational axis X and is coaxial with the driven shaft 8 so as to center the turbine wheel 26 on the driven shaft 8. An annular sealing member 43, mounted to a radially inner peripheral surface of the output hub 40, creates a seal at the interface of the transmission input shaft 8 and the output hub 40. Conventionally, the turbine blades 36 of the turbine wheel 26 interact, in a known manner, with the impeller blades 32 of the impeller wheel 24. The stator 28 is coupled in rotation to a stationary stator shaft 29 through the one-way (or overrunning) clutch 30.

At low turbine shaft speeds, the impeller wheel 24 causes hydraulic fluid to flow from the impeller wheel 24 to the turbine wheel 26, and to flow back to the impeller wheel 24 through the stator 28, thereby providing a first power flow path. The stator 28 is held against rotation by the one-way clutch 30 such that it can redirect the fluid flow and provide a reaction torque for torque multiplication. The one-way clutch 30 permits rotation of the stator 28 in one direction only. In other words, the stator 28 is typically mounted on the one-way clutch 30 to prevent the stator 28 from counter-rotation.

Figure 2B:
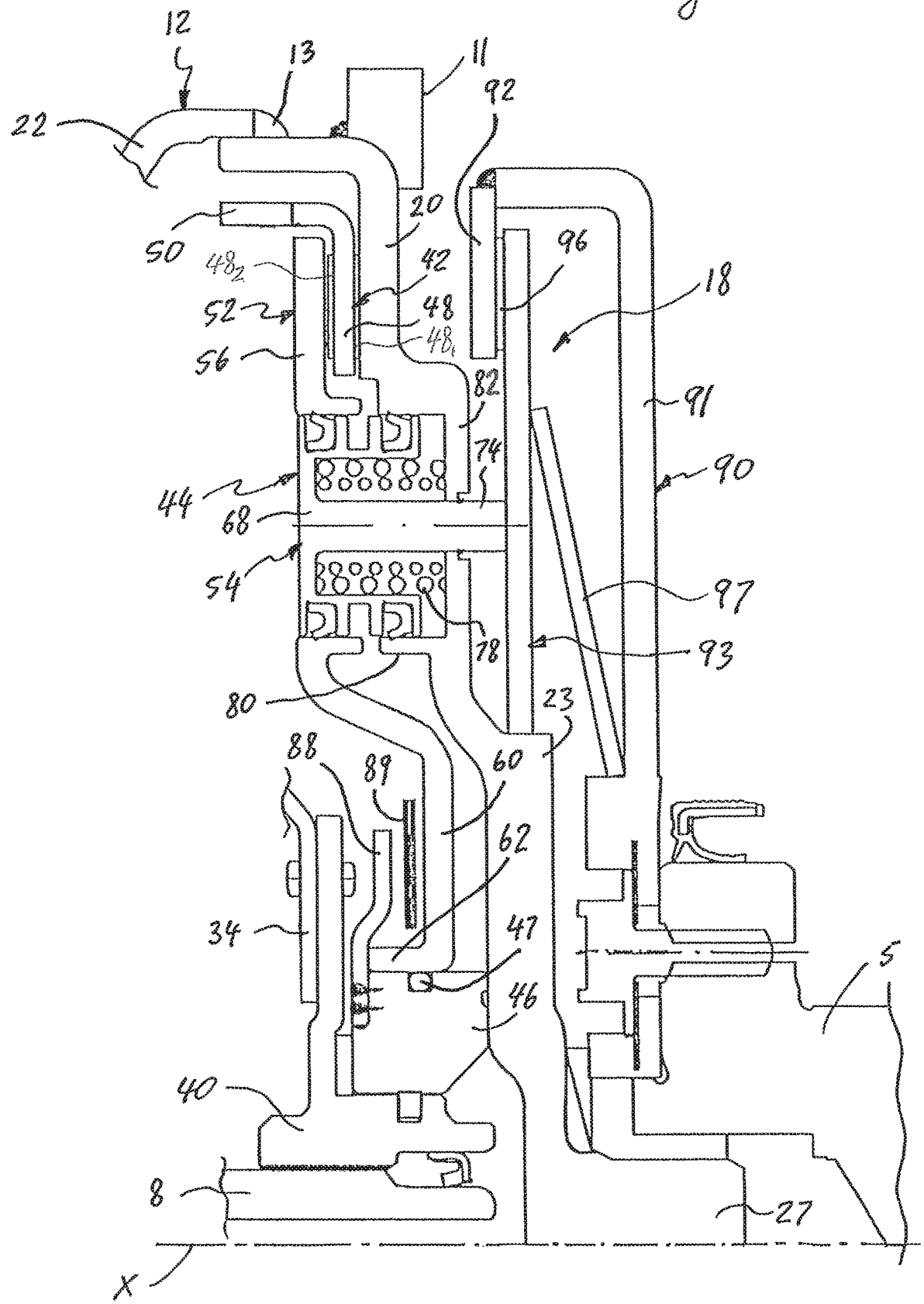
FIG. 2B is an enlarged view of a fragment of the hydrokinetic torque-coupling device of FIG. 2A showing a lock-up clutch and a selective clutch.
Figure 2C:
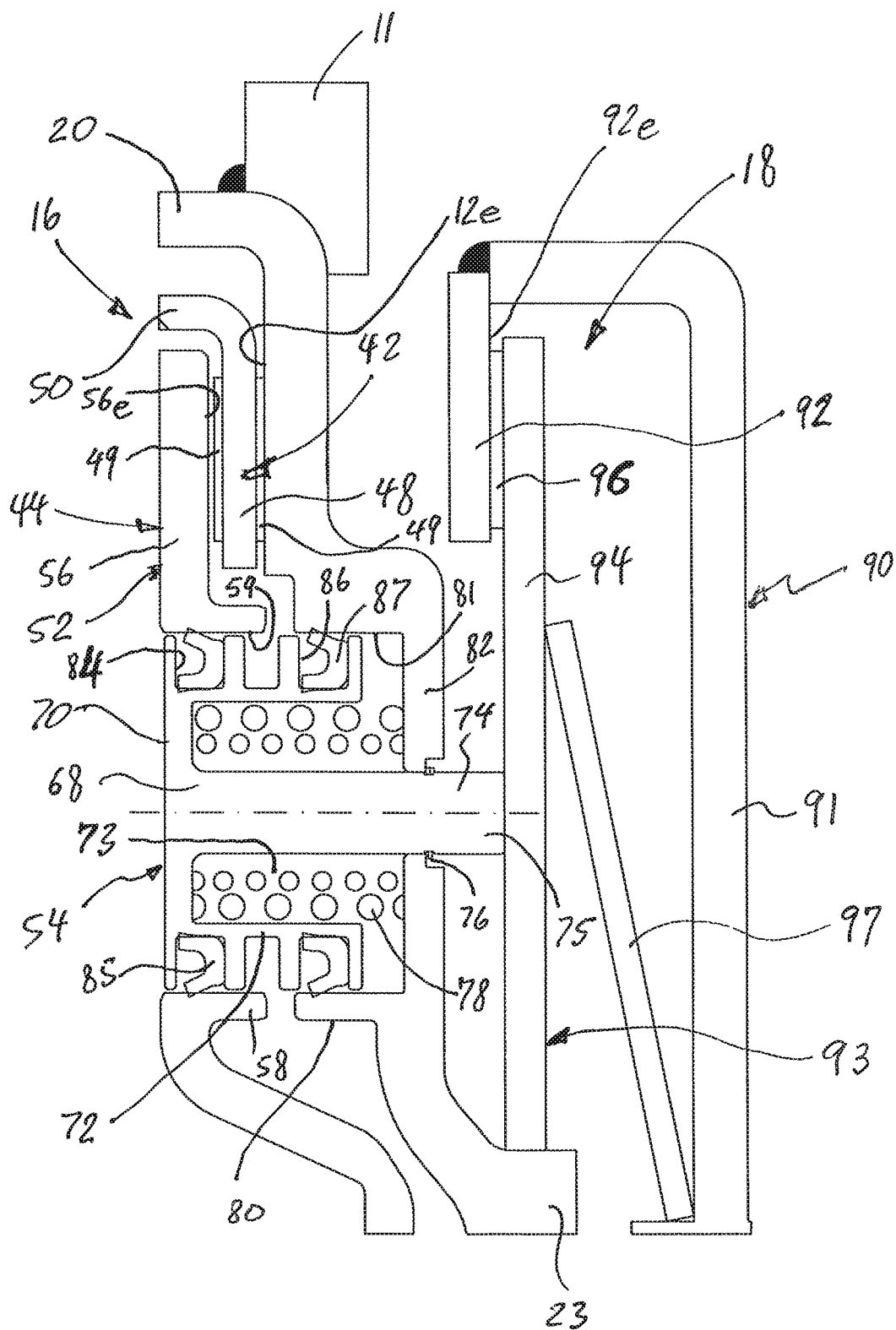
FIG. 2C is an enlarged view of a fragment of the hydrokinetic torque-coupling device shown in the rectangle "2C" of FIG. 2A.

The lock-up clutch 16 of the torque-coupling device 10 includes a friction ring 42, and a dual piston assembly 44, both axially movable to and from the cover shell 20. The friction ring 42 is axially moveable relative to the casing 12 along the rotational axis X to and from a locking (or inner engagement) surface 12e defined on the cover shell 20 of the casing 12, as best shown in FIGS. 2B and 2C. The friction ring 42 is configured to selectively frictionally engage the locking surface 12e of the cover shell 20 of the casing 12. The friction ring 42 is disposed axially between the dual piston assembly 44 and the cover shell 20.

The dual piston assembly 44 is mounted to a cover hub 46 so as to be rotatable relative thereto. Moreover, the dual piston assembly 44 is axially moveable along the cover hub 46. The cover hub 46 is non-moveably attached to the cover shell 20 by appropriate means, such as by welding. In turn, the cover hub 46 is slidingly mounted to the turbine hub 40 so as to be axially and rotatably moveable relative to the turbine hub 40.

The friction ring 42 includes a generally radially orientated annular friction portion 48, as best shown in FIG. 2B, and one or more driving tabs (or abutment elements) 50 extending axially outwardly from the friction portion 48 of the friction ring 42. Moreover, the driving tabs 50 are equiangularly and equidistantly spaced from each other. The friction ring 42 with the friction portion 48 and the driving tabs 50 is an integral (or unitary) part, e.g., made of a single or unitary component, but may be separate components fixedly connected together. Preferably, the driving tabs 50 are integrally press-formed on the friction ring 42. The friction ring 42 is drivingly engaged with the turbine wheel 26 through the driving tabs 50 and turbine tabs 37 fixed to an outer surface of the turbine shell 34 by appropriate means, such as by welding. In other words, the driving tabs 50 drivingly engage the turbine tabs 37 so that the friction ring 42 is non-rotatably coupled to the turbine wheel 26 while being axially moveable along the rotational axis X relative to the turbine shell 34 so as to selectively engage the friction ring 42 against the locking surface 12e of the casing 12.

The annular friction portion 48 of the friction ring 42 has axially opposite first and second friction faces $48_1$ and $48_2$, respectively, as best shown in FIG. 2B. The first friction face $48_1$ of the friction ring 42 (defining an engagement surface of the friction ring 42) faces the locking surface 12e of the cover shell 20 of the casing 12. An annular friction liner 49 is attached to each of the first and second friction faces $48_1$ and $48_2$ of the annular friction portion 48 of the friction ring 42, such as by adhesive bonding, as best shown in FIGS. 2B-4.

The dual piston assembly 44 includes an annular main (or first) piston 52 as best shown in FIGS. 2B and 2C axially movable to and from the cover shell 20, and at least one annular secondary (or second) piston 54 mounted to the main piston 52 and axially moveable relative to the main piston 52. According to the first exemplary embodiment of the present invention, the dual piston assembly 44 includes a plurality of the annular secondary pistons 54 spaced circumferentially equidistantly (or equiangularly) from one another around the rotational axis X. The friction portion 48 of the friction ring 42 is disposed axially between the main piston 52 and the locking surface 12e of the cover shell 20.

The main piston 52 includes a radially oriented annular piston body 56, at least one axially protruding boss 58, and an annular hub portion 60 having a cylindrical flange 62 that is proximate to the rotational axis X relative to the annular piston body 56 of the main piston 52, as best shown in FIGS. 2C-5. The cylindrical flange 62 of the hub portion 60 of the main piston 52 extends axially at a radially inner peripheral end of the hub portion 60 toward the turbine wheel 26.

Figure 5:
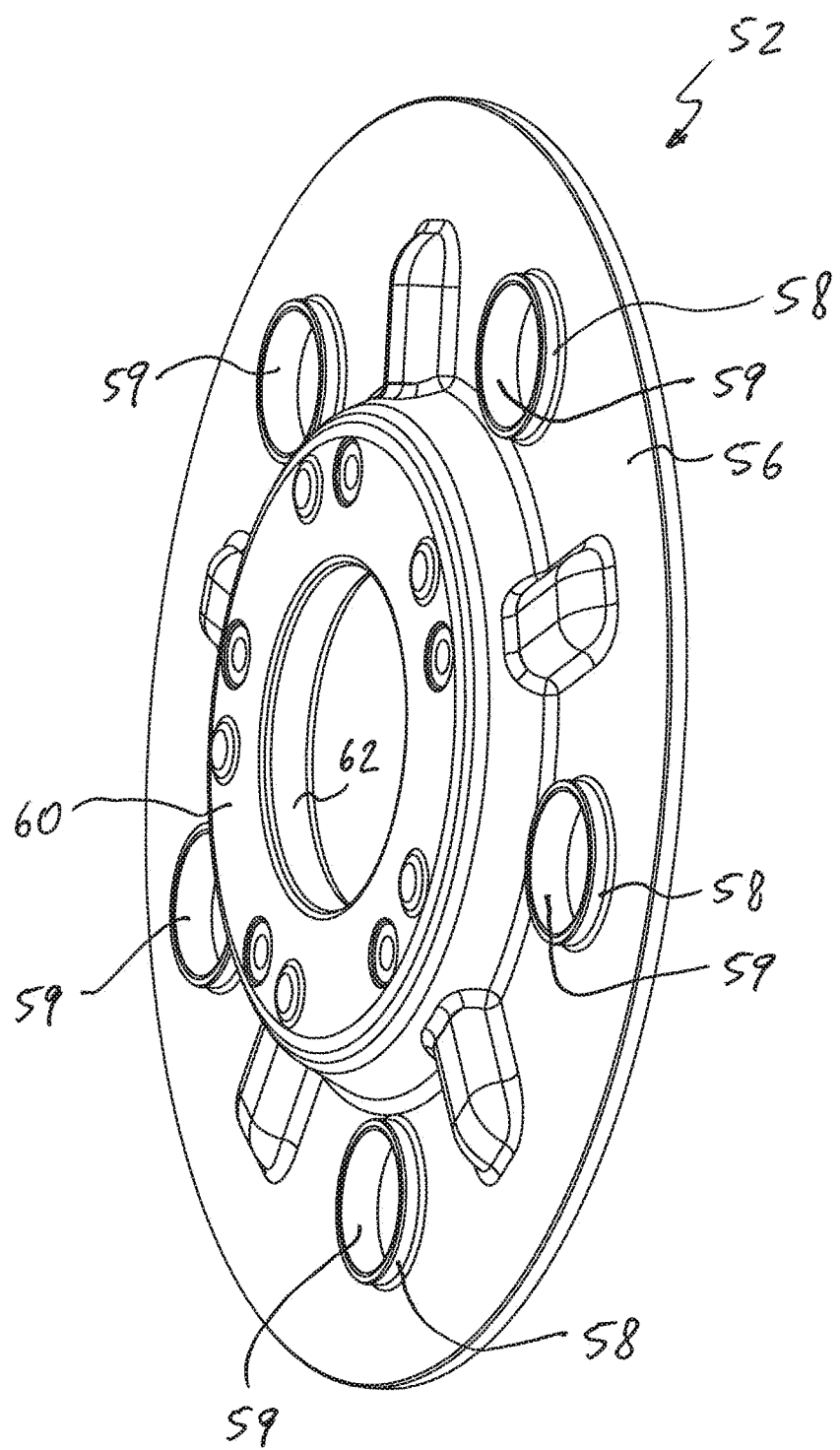
FIG. 5 is a perspective view of a main piston of the dual piston assembly in accordance with the first exemplary embodiment of the present invention.

According to the first exemplary embodiment of the present invention, the main piston 52 includes a plurality of the axially protruding bosses 58 spaced circumferentially equidistantly (or equiangularly) from one another around the rotational axis X, as best shown in FIG. 5. The bosses 58 axially protrude toward the cover shell 20. As further shown in FIGS. 2B-5, each of the bosses 58 has a cylindrical inner surface 59 extending axially parallel to the rotational axis X. The cylindrical inner surface 59 of each of the bosses 58 corresponds to and is configured for receiving one of the secondary pistons 54, as best shown in FIGS. 2B-4. The main piston 52 with the annular body 56 and the bosses 58 is an integral (or unitary) component, e.g., made of a single part, for example, by press-forming one-piece metal sheets, or separate components fixedly connected together.

As best shown in FIGS. 2B and 2C, the bosses 58 of the main piston 52 are disposed radially below the friction portion 48 of the friction ring 42. The main piston 52 is slidingly mounted to and axially moveable relative to the cover hub 46. A radially outer surface of the cover hub 46 includes an annular slot (or seal groove) for receiving a sealing member, such as an O-ring 47, as best shown in FIG. 4. The sealing member (e.g., O-ring) 47 creates a seal at the interface of the main piston 52 and the cover hub 46. As discussed in further detail below, the main piston 52 is axially movably relative to the cover hub 46 along this interface.

The main piston 52 is non-rotatably coupled to the cover hub 46, such as by means of a set of elastic (or flexible and resilient) tongues 89, which are arranged substantially on one circumference, and which are oriented tangentially between the cover hub 46 and the main piston 52, while permitting axial displacement of the main piston 52 relative to the cover hub 46. Specifically, as best shown in FIGS. 3 and 4, one free end of each of the axially flexible tongues 89 is secured to the main piston 52, while an opposite free end of each of the elastic tongues 89 is secured to a strap plate 88, which, in turn, is fixed to the cover hub 46 by appropriate means, such as by welding. The axially flexible tongues 89 are configured to transmit torque between the main piston 52 and the cover hub 46, while allowing axial displacement of the main piston 52 relative to the cover hub 46. In other words, the elastic tongues 89 are configured to be deformed elastically in the axial direction to enable relative movement of the main piston 52 relative to the cover hub 46. The resilient tongues 89 bias the main piston 52 away from the locking surface 12e of the cover shell 20.

The main piston 52 is axially moveable relative to the cover shell 20 between a lockup position and a non-lockup position of the lockup clutch 16. In the lockup position of the lockup clutch 16, as best shown in FIGS. 9-10 and 11-12, the main piston 52 non-rotatably frictionally engages the locking surface 12e of the cover shell 20 of the casing 12. In the non-lockup position of the lockup clutch 16, as best shown in FIGS. 2A-2C and 13-14, the main piston 52 is axially spaced from the locking surface 12e of the cover shell 20 of the casing 12 and does not frictionally engage the cover shell 20 of the casing 12. In other words, in the lockup position of the lockup clutch 16, the main piston 52 is non-rotatably coupled to the casing 12 so as to non-rotatably couple the casing 12 to the turbine hub 40 through the turbine shell 34. In the non-lockup position of the lockup clutch 16, the casing 12 is rotatably coupled to the turbine hub 40 through the torque converter 14. Moreover, the strap plate 88 limits axial movement of the main piston 52 in the direction away from the locking surface 12e of the cover shell 20, i.e., toward the non-lockup position of the lockup clutch 16, as best shown in FIG. 2A.

The cover shell 20 of the casing 12 includes at least one axially protruding piston cup 80 formed integrally with the cover shell 20 of the casing 12, as best shown in FIGS. 2B and 4. According to the first exemplary embodiment of the present invention, the cover shell 20 of the casing 12 includes a plurality of the axially protruding piston cups 80 spaced circumferentially equidistantly (or equiangularly) from one another around the rotational axis X, as best shown in FIG. 4. The piston cups 80 axially protrude from the cover shell 20 toward the secondary pistons 54. As further shown in FIGS. 2B-5, each of the piston cups 80 has a cylindrical inner surface 81 extending axially parallel to the rotational axis X. The cylindrical inner surface 81 of each of the piston cups 80 corresponds to and is configured for receiving one of the secondary pistons 54, as best shown in FIGS. 2B-4. The cover shell 20 of the casing 12 with the piston cups 80 is an integral (or unitary) component, e.g., made of a single part, for example, by press-forming one-piece metal sheets, or separate components fixedly connected together.

Further according to the first exemplary embodiment of the present invention, the secondary pistons 54 are preferably identical. Each of the secondary pistons 54 includes a cylindrical hollow body 68 having a head member 70, a cylindrical skirt 72 defining a hollow chamber 73 within the secondary piston 54, and a piston rod 74 axially extending from the head member 70 through the main piston 52, as best shown in FIGS. 2B and 2C. Each of the secondary pistons 54 is axially slidably mounted within both an associated one of the bosses 58 of the main piston 52 and an associated one of the cylindrical piston cups 80 of the cover shell 20 of the casing 12, as best shown in FIGS. 2B and 2C.

The cylindrical skirt 72 of the cylindrical hollow body 68 of each of the secondary pistons 54 has a first annular groove 84 and a second annular groove 86. The first and second annular grooves 84 and 86, respectively, are formed in the cylindrical skirt 72 of the hollow body 68 of each of the secondary pistons 54, for example, by machining or casting. An annular first piston sealing member 85 is disposed in the first annular groove 84, and an annular second piston sealing member 87 is disposed in the second annular groove 86. Each of the secondary pistons 54 is sealed within one of the bosses 58 of the main piston 52 by the first piston sealing member 85, and within one of the piston cups 80 of the cover shell 20 by the second piston sealing member 87. According to the first exemplary embodiment of the present invention, the secondary pistons 54 are axially reciprocatingly and sealingly moveable relative to both the main piston 52 and the cover shell 20 of the casing 12. The first and second piston sealing members 85 and 87, mounted to a radially outer peripheral surface of each of the secondary pistons 54, create a seal at the interface of the main piston 52 and each of the secondary pistons 54.

Moreover, each of the secondary pistons 54 is axially biased by at least one compression spring (such as a coil spring) 78 away from the cover shell 20 of the casing 12, as best shown in FIGS. 2B and 2C 2. The compression spring 78 is disposed within the hollow chamber 73 of the secondary piston 54 between the head member 70 of the secondary piston 54 and a radial wall 82 of the piston cup 80 of the cover shell 20. A free distal end 75 of the piston rod 74 is provided with a snap ring 76, disposed outside of the cover shell 20 for limiting axial movement of the secondary piston 54 in the direction toward the turbine wheel 26 and away from the cover shell 20 when the snap ring 76 mounted on the piston rod 74 of the secondary piston 54 engages the radial wall 82 of the piston cup 80 of the cover shell 20.

Each of the secondary pistons 54 is axially moveable relative to the main piston 52 and the piston cup 80 of the cover shell 20 between an extended position and a retracted position with respect to the main piston 52.

In the extended position, shown in FIGS. 2A-2C and 9-10, the secondary piston 54 extends into a bore of the axially protruding boss 58 of the main piston 52 away from the radial wall 82 of the piston cup 80 of the cover shell 20 so that the snap ring 76 on the piston rod 74 of the secondary piston 54 engages the radial wall 82 of the piston cup 80 of the cover shell 20. Moreover, the compression spring 78 biases the secondary pistons 54 to the extended position.

In the retracted position, shown in FIGS. 11-14, the secondary pistons 54 are retracted into the piston cup 80 of the cover shell 20 toward the radial wall 82 of the piston cup 80 so that the snap rings 76 on the piston rods 74 of the secondary pistons 54 are axially spaced away from the radial wall 82 of the piston cup 80 of the cover shell 20 toward the selective clutch 18.

The selective clutch 18 is disposed outside of the casing 12 between the output shaft 5 of the ICE 4 and the cover shell 20 of the casing 12. The selective clutch 18 includes an input member 90, an output member 93 drivingly and non-rotatably connectable to the input member 90, and a spring member 97 disposed between the input member 90 and the output member 93 of the selective clutch 18.

The input member 90 includes a clutch casing 91 including a generally radially orientated annular friction plate 92. The annular friction plate 92 defines a friction surface 92e facing the output member 93, as best shown in FIGS. 2B and 2C. The output member 93 includes a friction disc 94 and an annular friction liner 96 attached to the friction disc 94, such as by adhesive bonding, so as to axially face the friction surface 92e of the clutch casing 91, as best shown in FIGS. 2B and 2C 2. The clutch casing 91 of the input member 90 is rotatably mounted to a central boss 27 of the cover shell 20, while non-ratably coupled (preferably, non-moveably secured, such as by fasteners) to the crankshaft 5 of the ICE 4, as best shown in FIG. 2A. According to the first exemplary embodiment, the clutch casing 91 of the input member 90 is non-moveably secured to the crankshaft 5 of the ICE 4.

Figure 6:
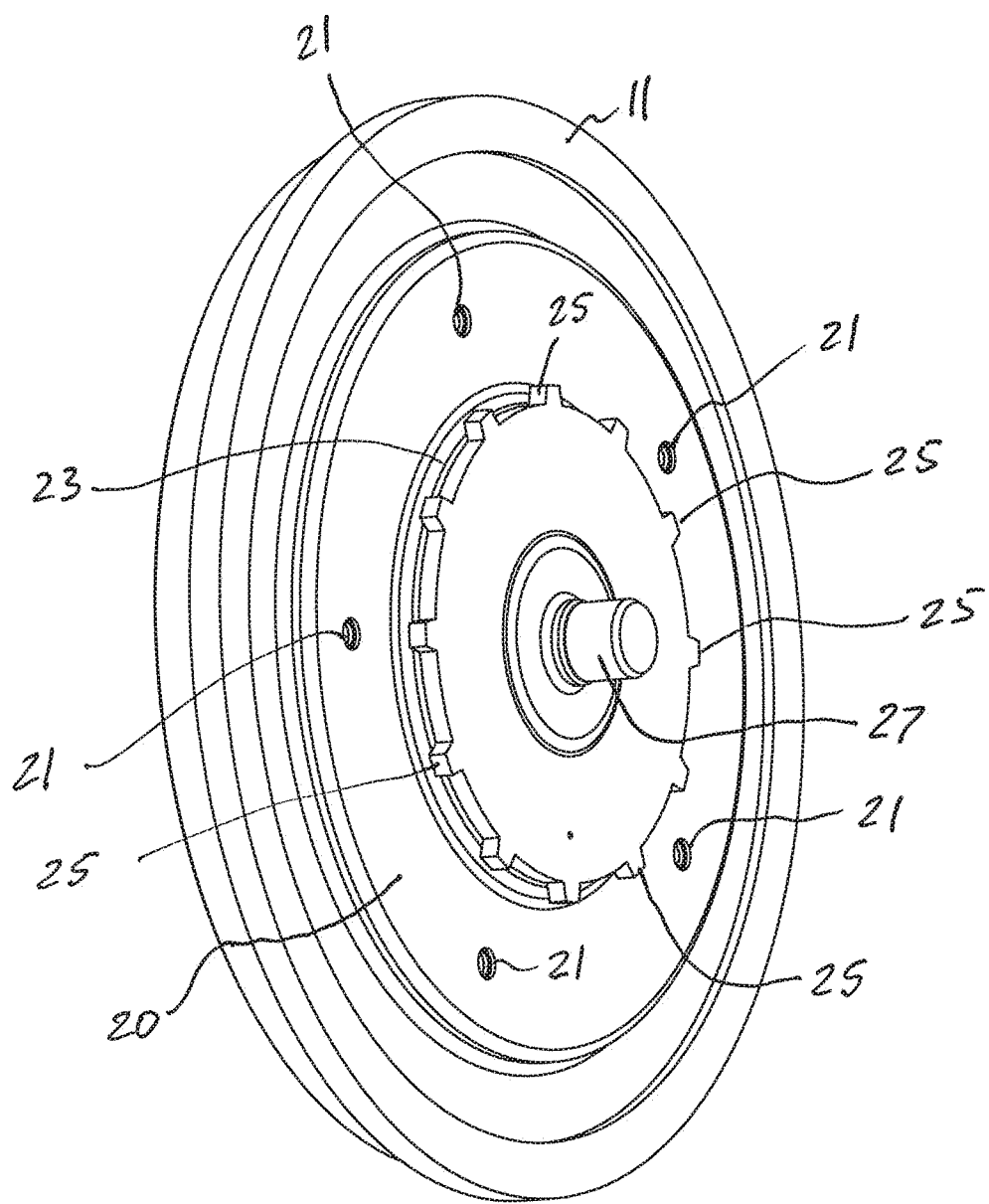
FIG. 6 is a perspective view of the cover shell of the hydrokinetic torque-coupling device in accordance with the first exemplary embodiment of the present invention.
Figure 7:
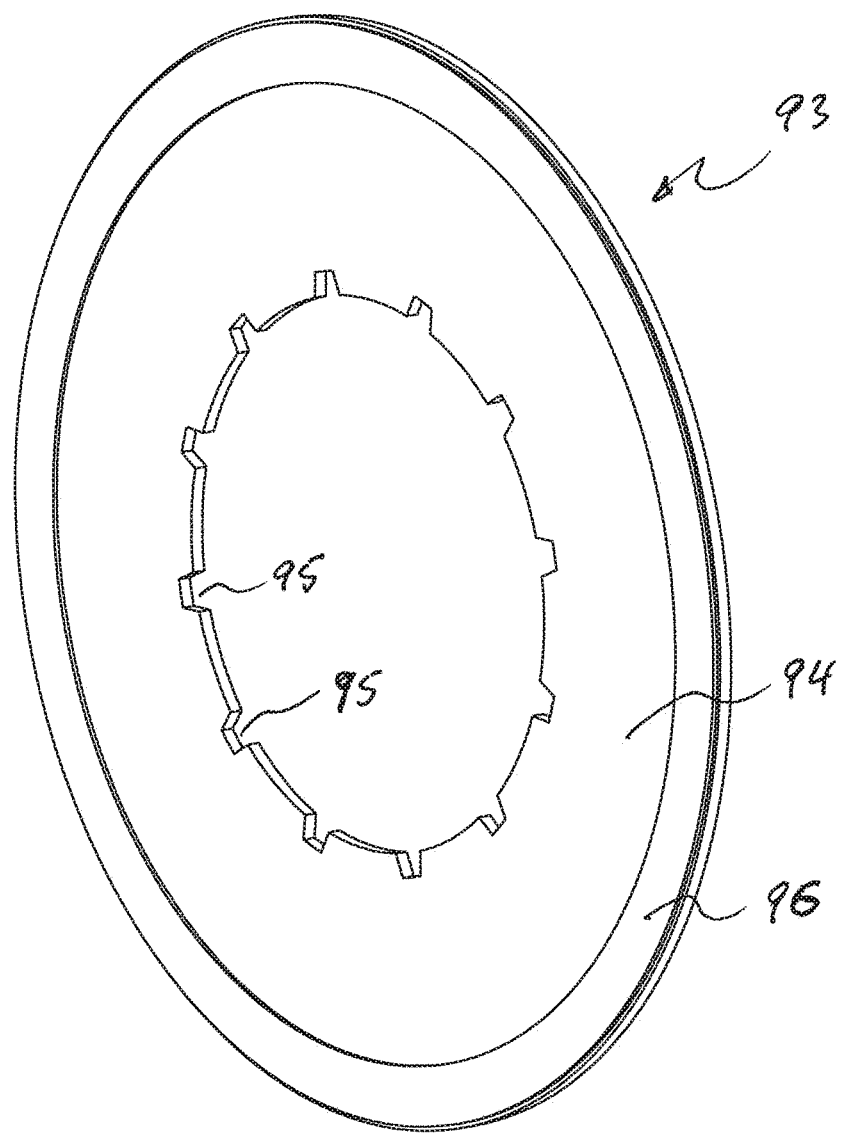
FIG. 7 is a perspective view of an output member of the selective clutch in accordance with the first exemplary embodiment of the present invention.
Figure 8:
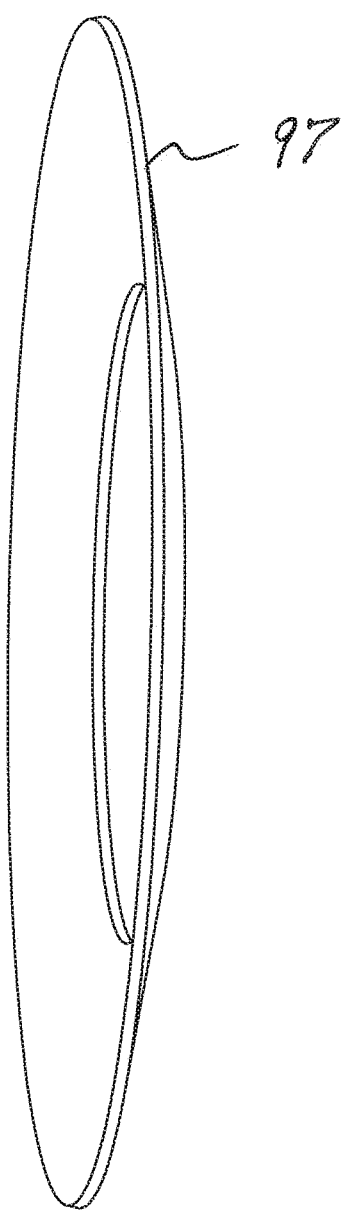
FIG. 8 is a perspective view of a spring member of the selective clutch in accordance with the first exemplary embodiment of the present invention.

As illustrated in FIG. 7, the friction disc 94 of the output member 93 is provided with one or more grooves 95 formed on a radially inner perimeter thereof. According to the first exemplary embodiment, the friction disc 94 has a plurality of the grooves 95, as illustrated in FIG. 7. The grooves 95 are equiangularly and equidistantly spaced from each other. The friction disc 94 with the grooves 95 is an integral (or unitary) part, e.g., made of a single or unitary component, but may be separate components fixedly connected together. Preferably, the grooves 95 are press-cut on the friction disc 94. Moreover, as best shown in FIG. 6, the cover shell 20 of the casing 12 is provided with one or more teeth 25 formed on a support boss 23 thereof. The teeth 25 are equiangularly and equidistantly spaced from each other. The cover shell 20 with the support boss 23 and the teeth 25 is an integral (or unitary) part, e.g., made of a single or unitary component, but may be separate components fixedly connected together. Preferably, the teeth 25 are machined on the support boss 23 of the cover shell 20. The grooves 95 are complementary to the teeth 25 of the cover shell 20 and are configured to slideably mesh with the teeth 25, so as to non-rotatably couple the output member 93 of the selective clutch 18 relative to the cover shell 20 of the casing 12, and permit axial displacement of the output member 93 relative to the cover shell 20.

The output member 93 of the selective clutch 18 is selectively axially moveable relative to the input member 90 between an engaged position and a disengaged position. In the engaged position of the selective clutch 18, shown in FIGS. 2A-2C and 9-10, the output shaft 5 of the ICE 4 is non-rotatably coupled to the casing 12 through the selective clutch 18 acting as a one-way clutch that permits transmission of the drive torque from the output shaft 5 of the ICE 4 to the casing 12 in one direction only, specifically from the ICE 4 to the casing 12, but not from the casing 12 to the ICE 4. In the disengaged position of the selective clutch 18, shown in FIGS. 11-14, the output shaft 5 of the ICE 4 is drivingly disconnected from the casing 12.

According to the first exemplary embodiment, the spring member 97 of the selective clutch 18 is a disc spring. Those skilled in the art understand tha other appropriate springs are within the scope of the present invention. As best shown in FIGS. 2B and 2C, the spring member 97 biases the output member 93 toward the engaged position. Moreover, a rate (or stiffness) of the spring member 97 is such that the output member 93 non-rotatably engages the friction plate 92 of the clutch casing 91 in the engaged position of the selective clutch 18, thus non-rotatably coupling the casing 12 of the hydrokinetic torque-coupling device 10 to the output shaft 5 of the ICE 4. As best shown in FIGS. 2B and 2C, the free distal end 75 of the piston rod 74 thus engages (i.e., is in contact with) the friction disc 94 of the output member 93.

The sealed casing 12 and the dual piston assembly 44 collectively define a hydraulically sealed apply chamber CA between the impeller shell 22 and the dual piston assembly 44, and a hydraulically sealed release chamber CR between the cover shell 20, the dual piston assembly 44 and the cover hub 46. It is known to those skilled in the art that hydrokinetic torque coupling devices typically include a fluid pump and a control mechanism controlling and regulating hydraulic pressure of the hydrokinetic torque coupling device. The control mechanism regulates the pressure in the apply chamber CA and in the release chamber CR (i.e., on the axially opposite sides of a lockup piston) through operation of a valve system to selectively position a lockup piston in a desired position associated with an intended one of the operating modes.

The compression spring 78 of each of the secondary pistons 54 is sized to resist fluid pressure of 500 KPa. In other words, when the fluid pressure in the apply chamber CA is equal to or more than 500 KPa, the secondary pistons 54 move rightward in the direction of FIGS. 2B and 2C toward the cover shell 20 of the casing 12 and axially displace the friction disc 94 of the output member 93 of the selective clutch 18 to the disengaged position.

The hydrokinetic torque-coupling device 10 in accordance with the present invention has four modes of operation.

In a first mode of operation, illustrated in FIGS. 2A-2C, a release pressure of the lock-up clutch 16 in the release chamber CR is about 500 KPa, while an apply pressure of the lock-up clutch 16 in the apply chamber CA is about 200 KPa. Subsequently, the main piston 52 is in the non-lockup position and the secondary pistons 54 are in the extended position, in which both the main piston 52 and the secondary pistons 54 are spaced from the cover shell 20 a maximum distance. In that event the friction ring 42 does not frictionally engage the locking surface 12e of the cover shell 20 of the casing 12 by the main piston 52 (i.e., the non-lockup position of the lock-up clutch 16), and the output member 93 of the selective clutch 18 is in the engaged position. In the first mode of operation, the main piston 52 is axially spaced from the friction ring 42, and the torque-coupling device 10 is in a hydrodynamic mode with the ICE 4 drivingly coupled thereto.

Figure 9:
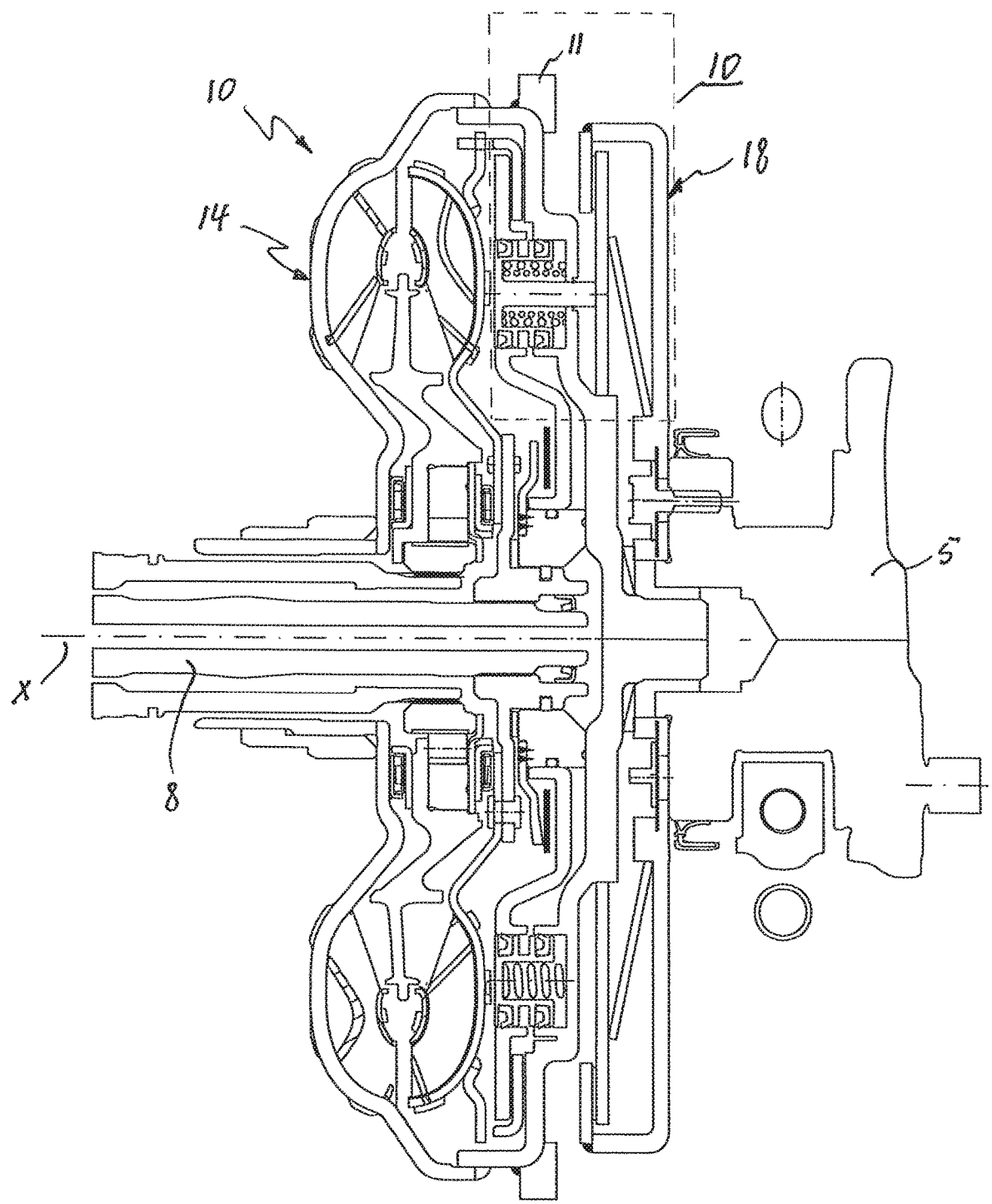
FIG. 9 is a sectional view of the hydrokinetic torque-coupling device in accordance with the first exemplary embodiment of the present invention in a second mode of operation.
Figure 10:
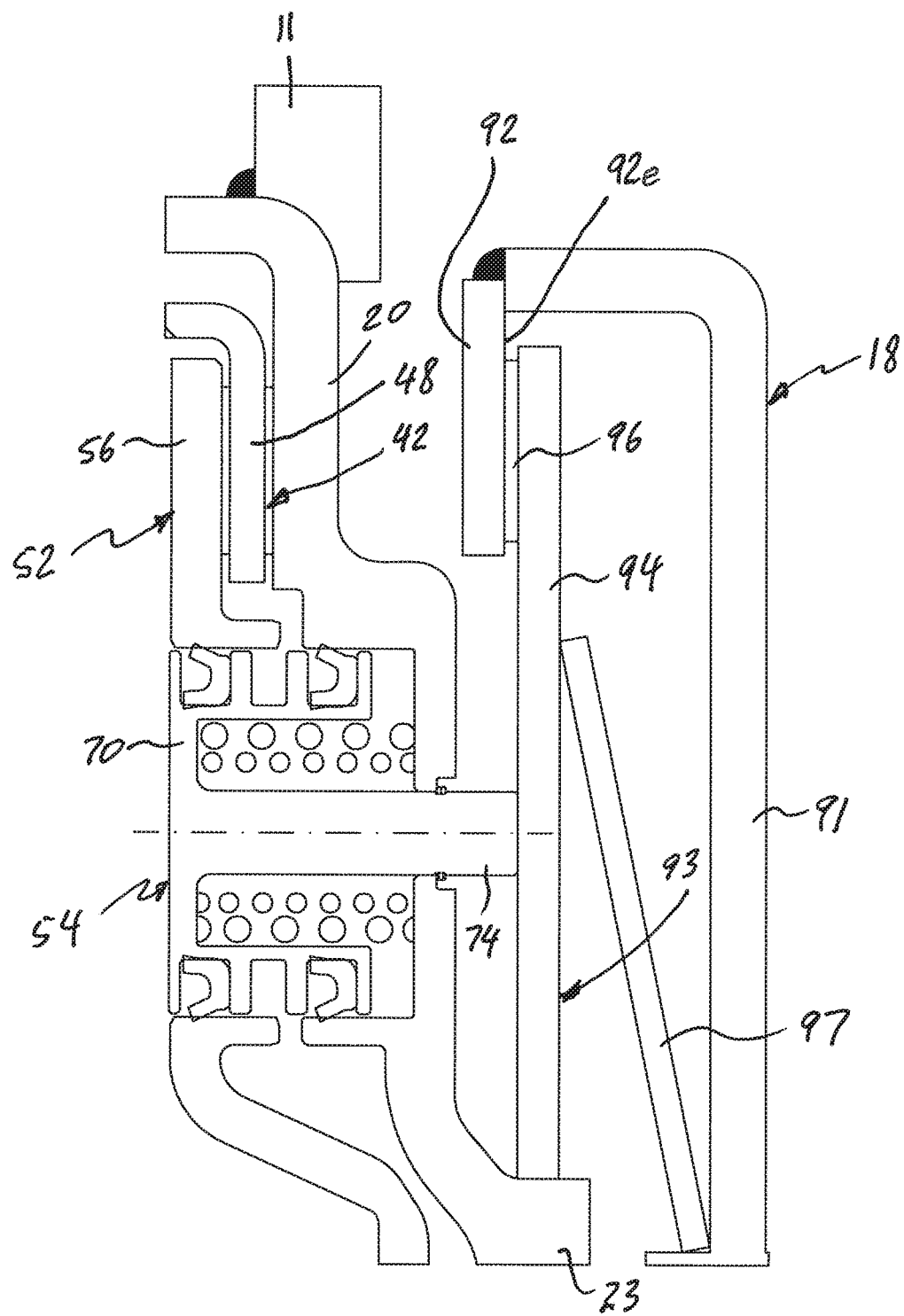
FIG. 10 is an enlarged view of a fragment of the hydrokinetic torque-coupling device shown in the rectangle "10" of FIG. 9.

In a second mode of operation, illustrated in FIGS. 9 and 10, the apply pressure of the lock-up clutch 16 in the apply chamber CA is between 0-500 KPa, preferably between 100-500 KPa. Consequently, the main piston 52 is moved rightward (as shown in FIGS. 9 and 10) toward the cover shell 20 against resilient forces of the tongues 89 to the lockup position. In that event, the main piston 52 presses against the friction portion 48 of the friction ring 42 to frictionally non-rotatably engage the friction ring 42 against the locking surface 12e of the cover shell 20 of the casing 12 (i.e., the lockup position of the lock-up clutch 16). The secondary pistons 54 remain in the extended position, in which the output member 93 of the selective clutch 18 is in the engaged position. In the second mode of operation, the ICE 4 and the transmission shaft 8 are directly connected. In the second mode of operation a battery of the hybrid vehicle may be in charging mode.

Figure 11:
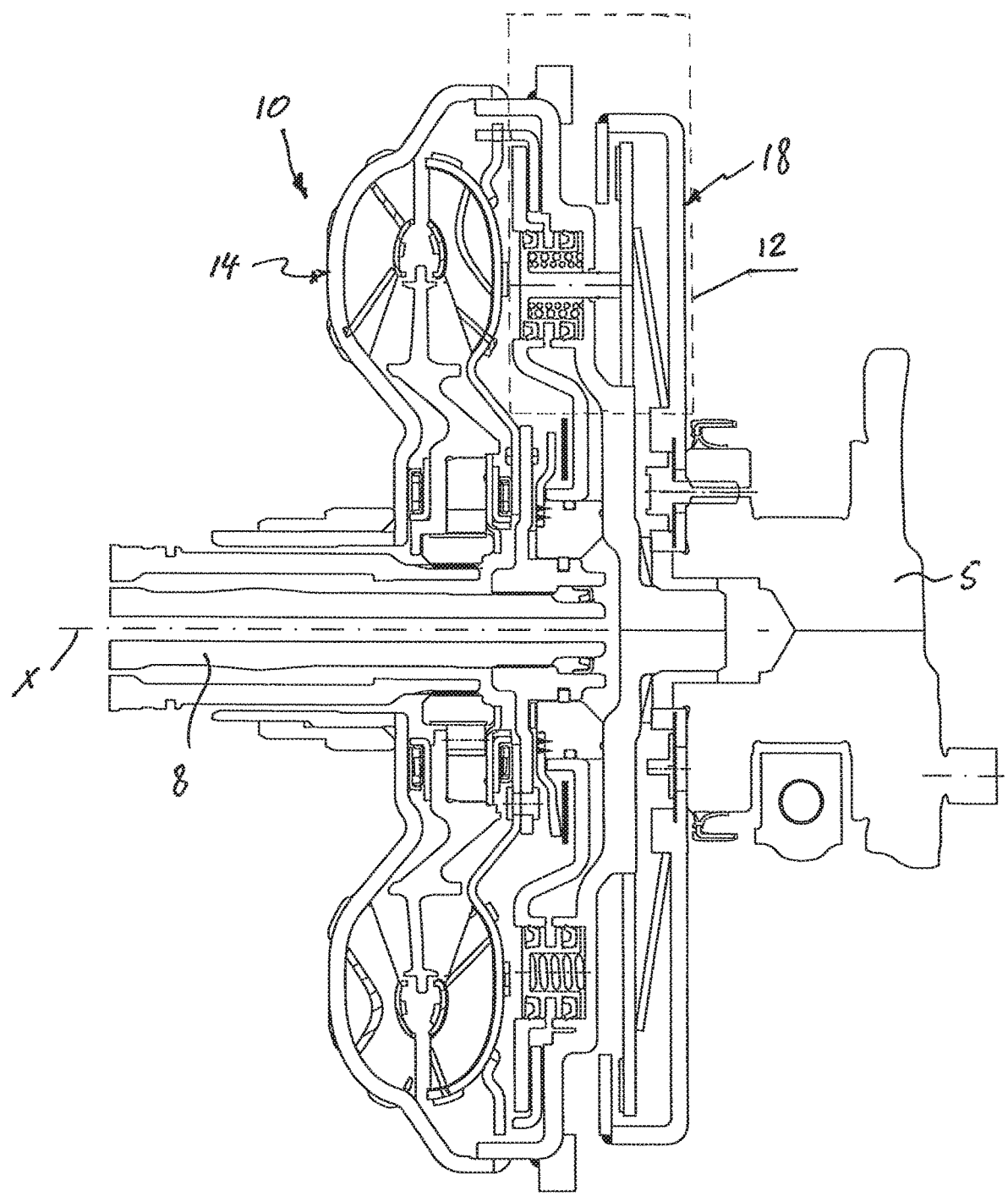
FIG. 11 is a sectional view of the hydrokinetic torque-coupling device in accordance with the first exemplary embodiment of the present invention in a third mode of operation.
Figure 12:
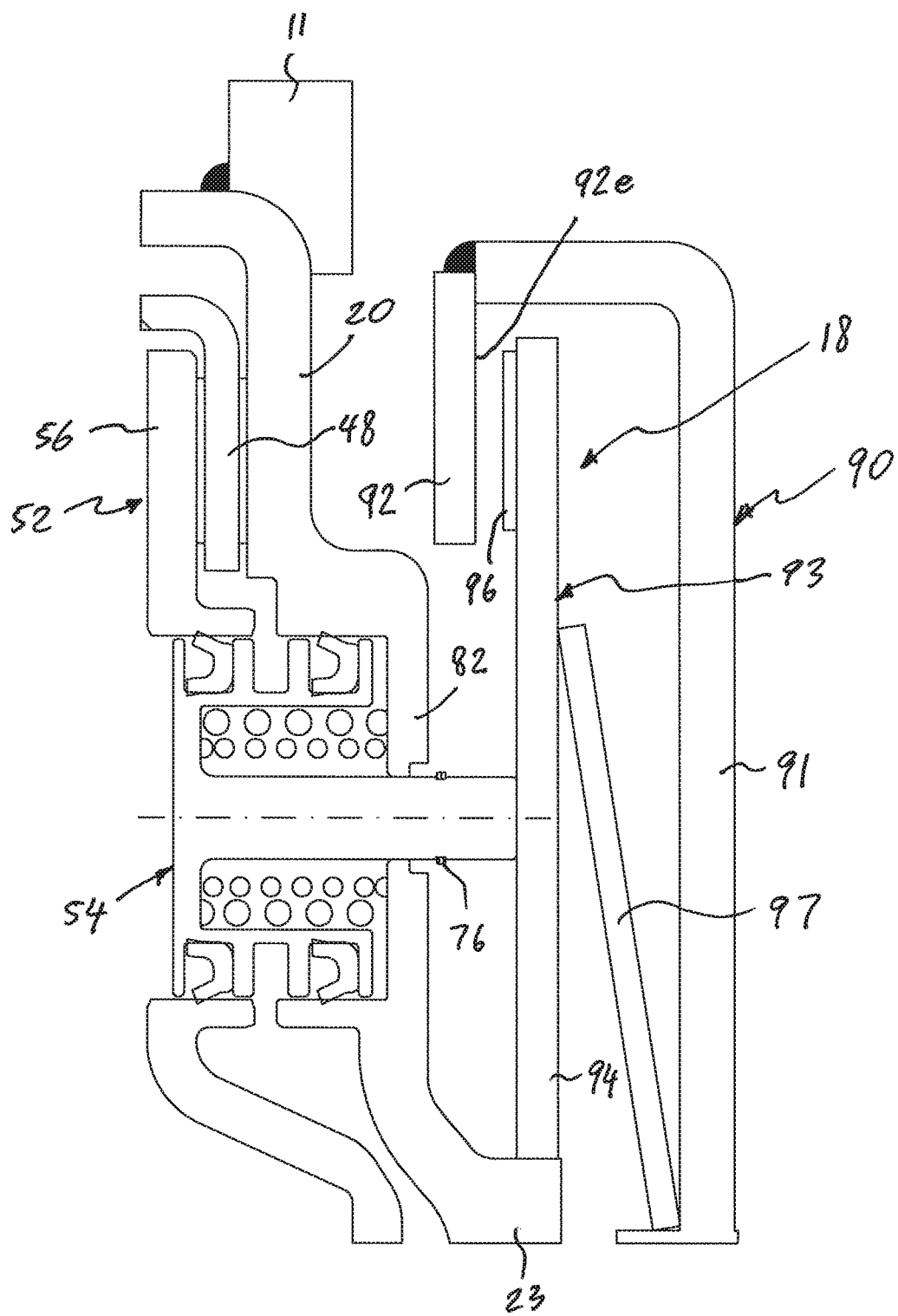
FIG. 12 is an enlarged view of a fragment of the hydrokinetic torque-coupling device shown in the rectangle "12" of FIG. 11.

In a third mode of operation, illustrated in FIGS. 11 and 12, the apply pressure of the lock-up clutch 16 in the apply chamber CA is between 500-800 KPa. Consequently, the secondary pistons 54 move rightward in the direction toward the cover shell 20 of the casing 12 and the selective clutch 18 to the retracted position to place the selective clutch 18 in the disengaged position. Specifically, the free distal end 75 of the piston rod 74 pushes the friction disc 94 of the output member 93 away from the friction surface 92e of the friction plate 92 of the clutch casing 91 against the resilient force of the spring member 97, and places the selective clutch 18 in the disengaged position. The main piston 52 remains in the lockup position. In the third mode of operation, the ICE 4 and transmission shaft 8 are disconnected, while the electric machine 6 and the transmission shaft 8 are directly connected. The ICE 4 may be off. The hybrid vehicle is in re-generation mode or an electric-drive (or E-drive) mode.

Figure 13:
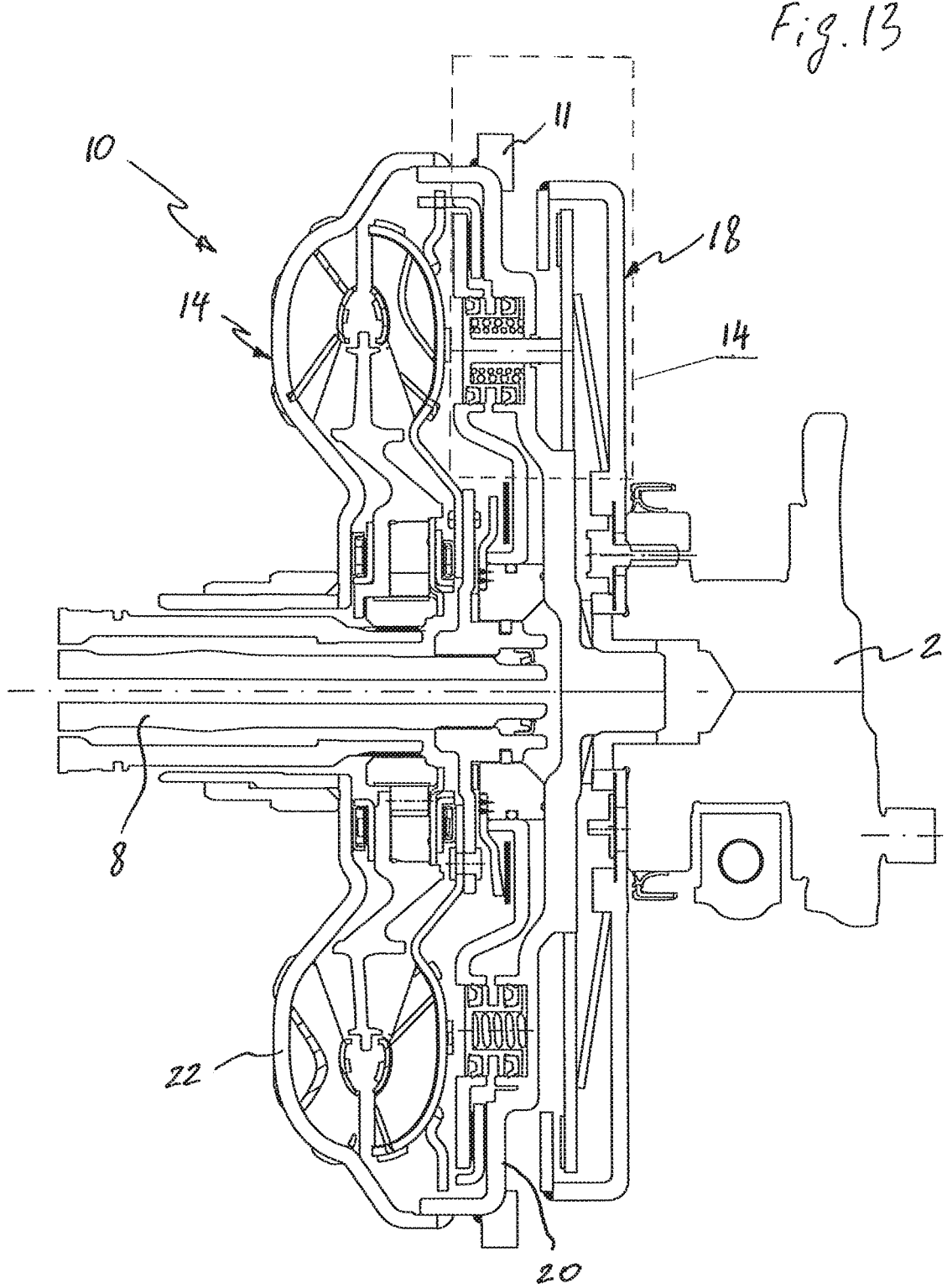
FIG. 13 is a sectional view of the hydrokinetic torque-coupling device in accordance with the first exemplary embodiment of the present invention in a fourth mode of operation.
Figure 14:
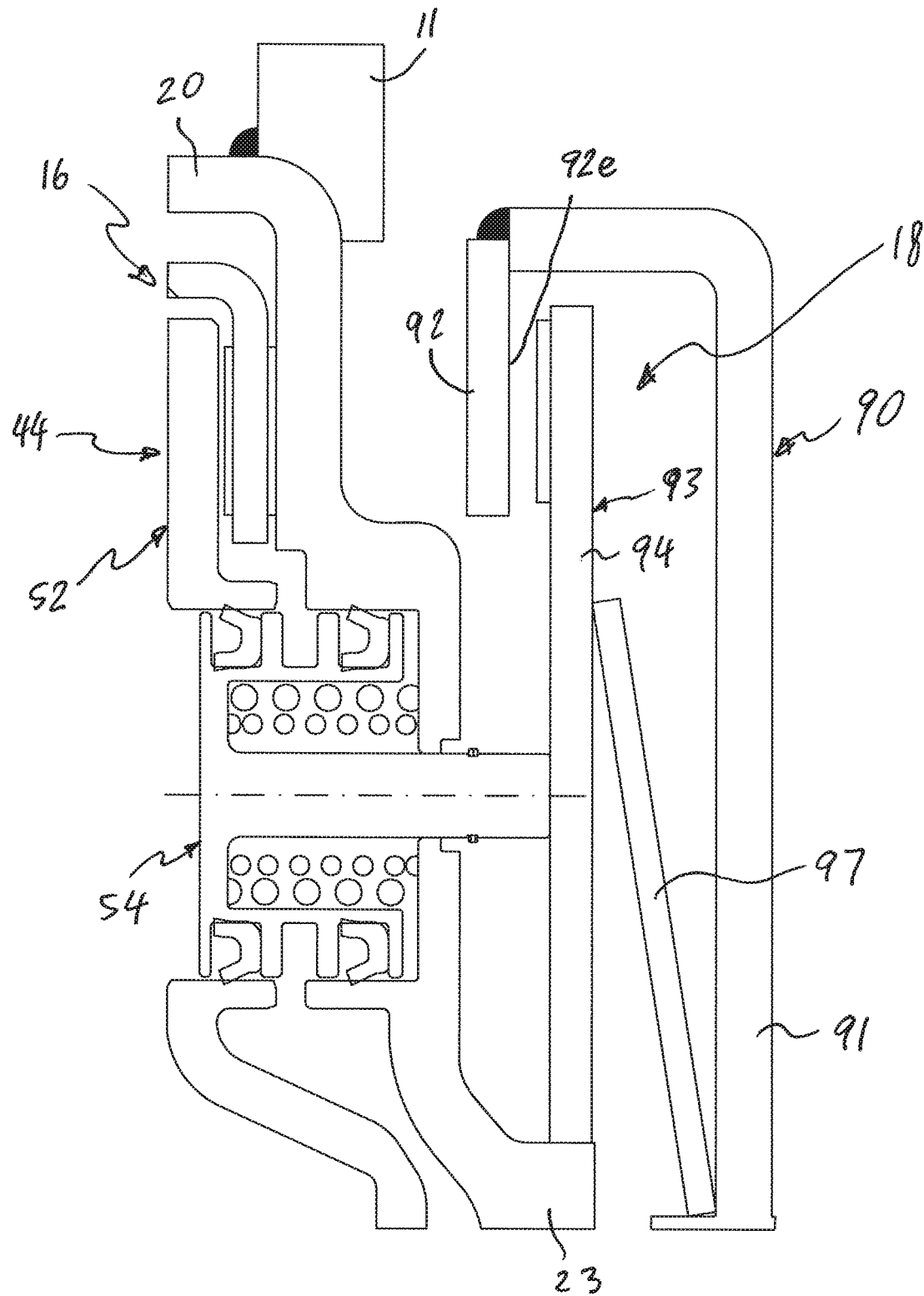
FIG. 14 is an enlarged view of a fragment of the hydrokinetic torque-coupling device shown in the rectangle "14" of FIG. 13.

In a fourth mode of operation, illustrated in FIGS. 13 and 14, the release pressure of the lock-up clutch 16 in the release chamber CR is about 800 KPa, and the apply pressure of the lock-up clutch 16 in the apply chamber CA is also about 800 KPa. Consequently, the secondary pistons 54 remain in the retracted position and maintain the selective clutch 18 in the disengaged position. However, the main piston 52 moves leftward (as illustrated in FIGS. 13-14) away from the cover shell 20 of the casing 12 to the non-lockup position of the lock-up clutch 16. In the fourth mode of operation, the ICE 4 is on and ready to switch to the first mode of operation.

Various modifications, changes, and alterations may be practiced with the above-described embodiment, including but not limited to the additional embodiments shown in FIGS. 15-29. In the interest of brevity, reference characters that are discussed above in connection with FIGS. 1-14 are not further elaborated upon below, except to the extent necessary or useful to explain the additional embodiments of FIGS. 15-29. Modified components and parts are indicated by the addition of a hundred digits to the reference numerals of the components or parts.

In a hydrokinetic torque-coupling device 110 of a second exemplary embodiment illustrated in FIGS. 15-19, the dual piston assembly 44 of the torque-coupling device 10 is replaced by a dual piston assembly 144 of the torque-coupling device 110. The hydrokinetic torque-coupling device 110 of FIGS. 15-19 corresponds substantially to the hydrokinetic torque-coupling device 10 of FIGS. 1-14, and portions of the dual piston assembly 144 which differ will be explained in detail below. In the second exemplary embodiment of the present invention illustrated in FIGS. 15-19, the dual piston assembly 144 is mounted to a cover hub 46 so as to be rotatable relative thereto. Moreover, the dual piston assembly 144 is axially moveable along the cover hub 46.

Figure 16:
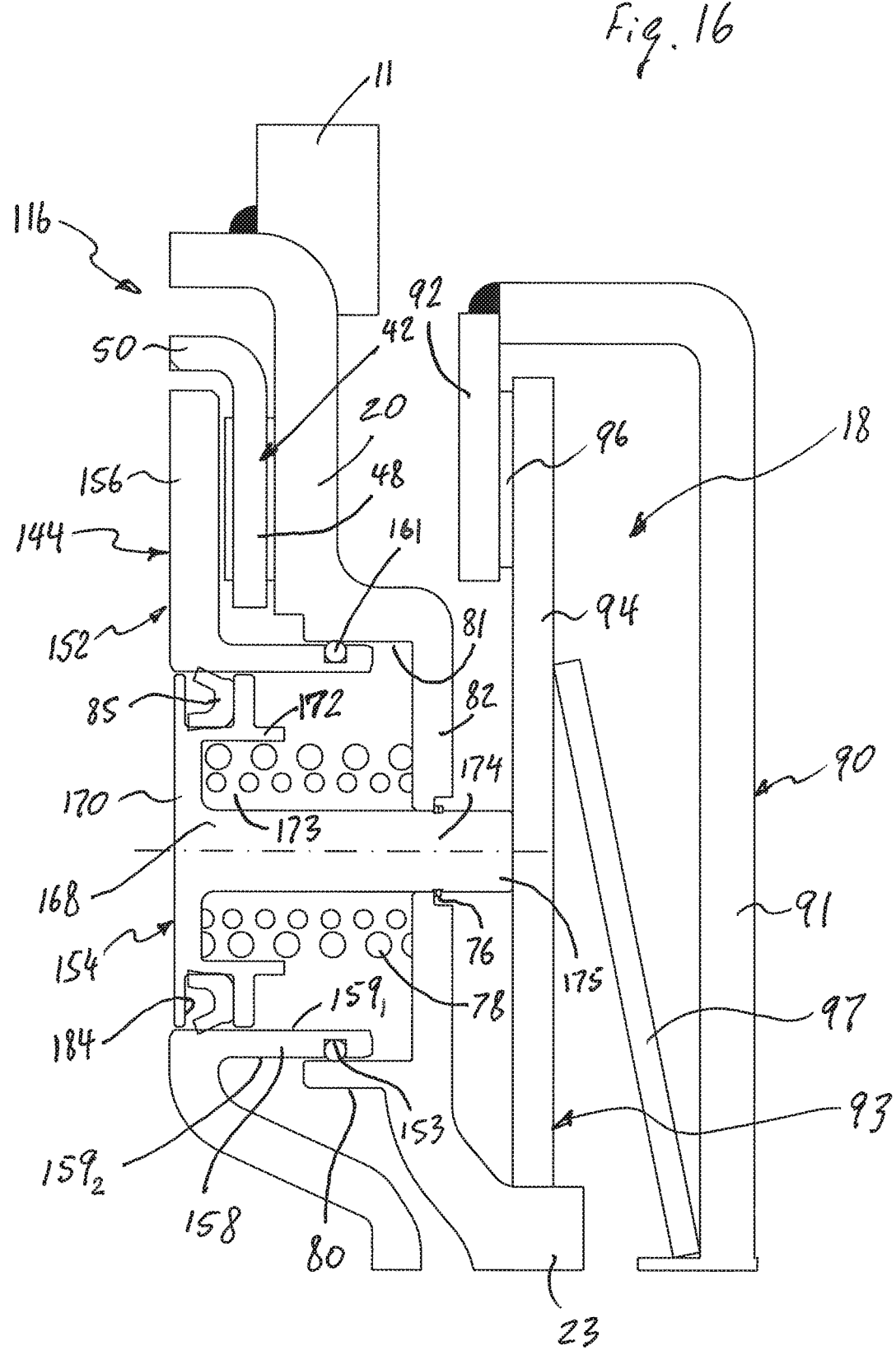
FIG. 16 is an enlarged view of a fragment of the hydrokinetic torque-coupling device shown in the rectangle "16" of FIG. 15.
Figure 17:
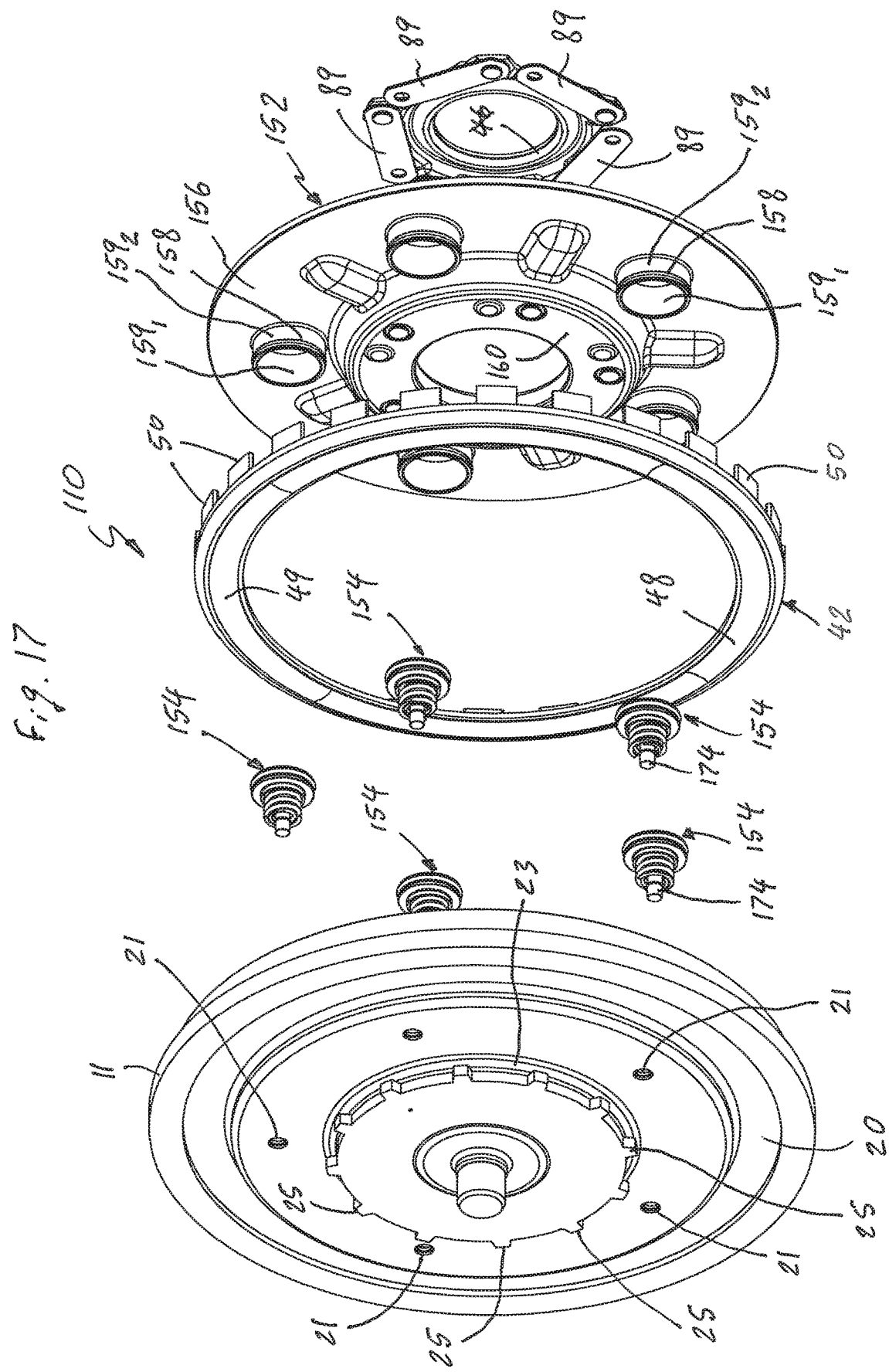
FIG. 17 is an exploded perspective view from the rear of the lock-up clutch with a dual piston assembly and a cover shell in accordance with the second exemplary embodiment of the present invention.

The dual piston assembly 144 includes an annular main (or first) piston 152, as best shown in FIG. 16, axially movable to and from the cover shell 20, and at least one annular secondary (or second) piston 154 mounted to the main piston 152 and axially moveable relative to the main piston 152. According to the second exemplary embodiment of the present invention, the dual piston assembly 144 includes a plurality of the annular secondary pistons 154 spaced circumferentially equidistantly (or equiangularly) from one another around the rotational axis X. The friction portion 48 of the friction ring 42 is disposed axially between the main piston 152 and the locking surface 12e of the cover shell 20.

The main piston 152 includes a radially oriented annular piston body 156, at least one axially protruding boss 158, and an annular hub portion 160 having a cylindrical flange 162 that is proximate the rotational axis X relative to the annular piston body 156 of the main piston 152. The cylindrical flange 162 of the hub portion 160 of the main piston 152 extends axially at a radially inner peripheral end of the hub portion 160 toward the turbine wheel 26.

Figure 18:
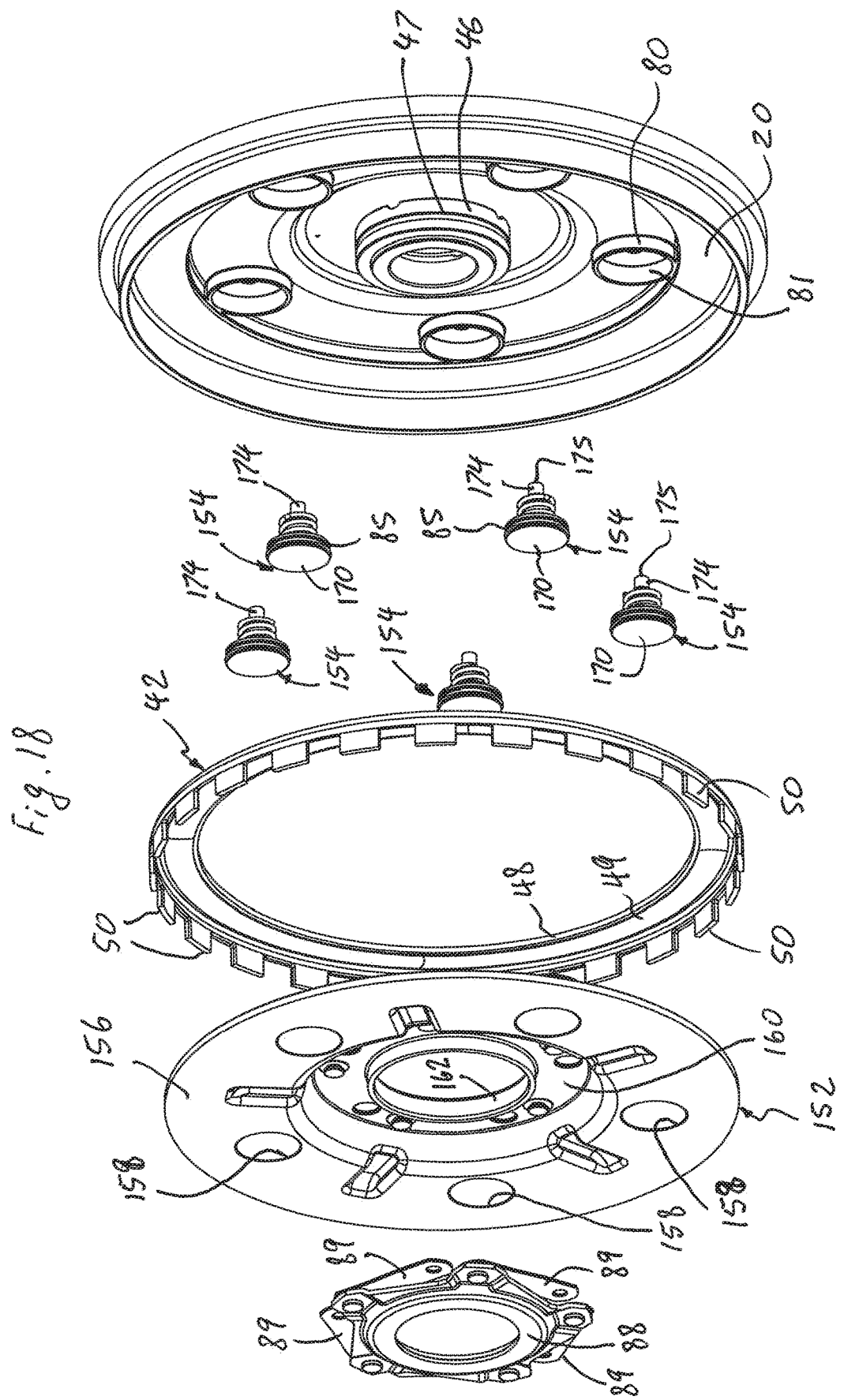
FIG. 18 is an exploded perspective view from the front of the lock-up clutch with the dual piston assembly and the cover shell in accordance with the second exemplary embodiment of the present invention.
Figure 19:
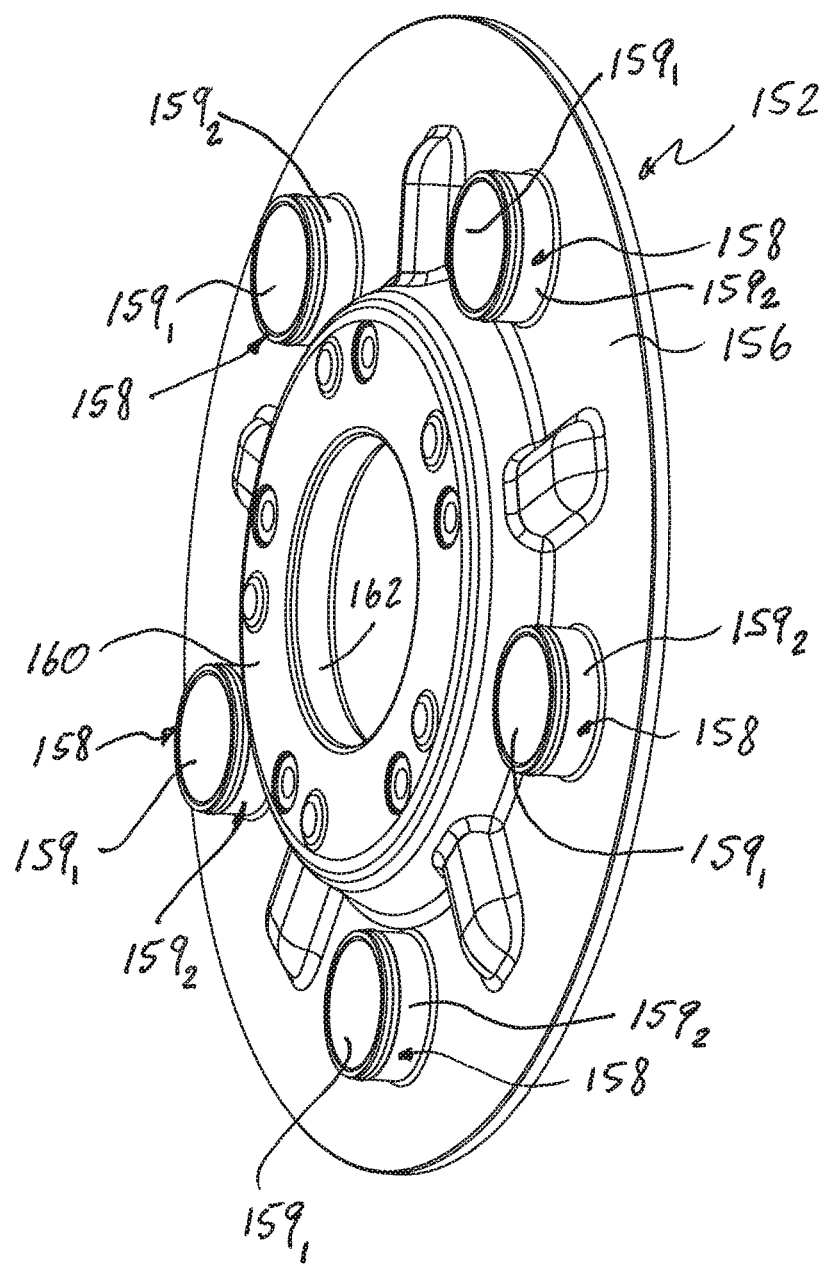
FIG. 19 is a perspective view of a main piston of the dual piston assembly in accordance with the second exemplary embodiment of the present invention.

According to the second exemplary embodiment of the present invention, the main piston 152 includes a plurality of the axially protruding bosses 158 spaced circumferentially equidistantly (or equiangularly) from one another around the rotational axis X, as best shown in FIGS. 16 and 19. Each of the bosses 158 axially protrudes toward the cover shell 20 and into one of the axially protruding piston cups 80 of the cover shell 20. As further shown in FIGS. 16-19, each of the bosses 158 has a cylindrical inner surface $159_1$ and a cylindrical outer surface $159_2$ both extending axially parallel to the rotational axis X. The cylindrical inner surface $159_1$ of each of the bosses 158 correspond to and are configured for receiving one of the secondary pistons 154, as best shown in FIG. 16. The cylindrical outer surface $159_2$ of each of the bosses 158 corresponds to and is configured for being received into one of the axially protruding piston cups 80 of the cover shell 20, as best shown in FIG. 16. The main piston 152 with the annular body 156 and the bosses 158 is an integral (or unitary) component, e.g., made of a single part, for example, by press-forming one-piece metal sheets, or includes separate components fixedly connected together.

As best shown in FIG. 16, the bosses 158 of the main piston 152 are disposed radially below the friction portion 48 of the friction ring 42. The main piston 152 is slidingly mounted to and axially moveable relative to the cover hub 46. A radially outer surface of the cover hub 46 includes an annular slot (or seal groove) for receiving a sealing member, such as an O-ring 47, as best shown in FIG. 18. The sealing member (e.g., O-ring) 47 creates a seal at the interface of the main piston 152 and the cover hub 46. As discussed in further detail below, the main piston 152 is axially movably relative to the cover hub 46 along this interface. The main piston 152 is non-rotatably coupled to the cover hub 46, such as by means of a set of elastic (or flexible) tongues 89, which are arranged substantially on one circumference, and which are oriented tangentially between the cover hub 46 and the main piston 152, while permitting axial displacement of the main piston 152 relative to the cover hub 46.

The main piston 152 is axially moveable relative to the cover shell 20 between a lockup position and a non-lockup position of a lockup clutch 116. In the lockup position of the lockup clutch 116, the main piston 152 non-rotatably frictionally engages the locking surface 12e of the cover shell 20 of the casing 12. In the non-lockup position of the lockup clutch 116, best shown in FIG. 16, the main piston 152 is axially spaced from the locking surface 12e of the cover shell 20 of the casing 12 and does not frictionally engage the cover shell 20 of the casing 12. In other words, in the lockup position of the lockup clutch 116, the main piston 152 is non-rotatably coupled to the casing 12 so as to non-rotatably couple the casing 12 to the turbine hub 40 through the turbine shell 34, while in the non-lockup position of the lockup clutch 116, the casing 12 is rotatably coupled to the turbine hub 40 through the torque converter 14. Moreover, the strap plate 88 limits axial movement of the main piston 152 in the direction away from the locking surface 12e of the cover shell 20, i.e., toward the non-lockup position of the lockup clutch 116, as best shown in FIGS. 2A and 2B.

Further according to the second exemplary embodiment of the present invention, the secondary pistons 154 are preferably identical. Each of the secondary pistons 154 includes a cylindrical hollow body 168 having a head member 170, a cylindrical skirt 172 defining a hollow chamber 173 within the secondary piston 154, and a piston rod 174 axially extending from the head member 170 through the main piston 152, as best shown in FIG. 16. Each of the secondary pistons 154 is axially slidably mounted within an associated one of the bosses 158 of the main piston 152, while each of the bosses 158 of the main piston 152 is axially slidably mounted within an associated one of the cylindrical piston cups 80 of the cover shell 20 of the casing 12, as best shown in FIG. 2. The piston rod 174 of each of the secondary pistons 154 axially extends through a hole 21 extending through each of the piston cups 80 of the cover shell 20, as best shown in FIG. 16. The secondary piston 154 with the cylindrical hollow body 168 and the piston rod 174 is an integral (or unitary) component, e.g., made of a single part, for example, by casting or machining, or includes separate components fixedly connected together.

The cylindrical skirt 172 of the cylindrical hollow body 168 of each of the secondary pistons 154 has an annular groove 84 formed in the cylindrical skirt 172 of the hollow body 168 of each of the secondary pistons 154, for example, by machining or casting. An annular first piston sealing member 85 is disposed in the first annular groove 84, and an annular second piston sealing member 87 is disposed in the second annular groove 86. Each of the secondary pistons 54 is sealed within one of the bosses 58 of the main piston 52 by the first piston sealing member 85, and within one of the piston cups 80 of the cover shell 20 by the second piston sealing member 87. According to the second exemplary embodiment of the present invention, the secondary pistons 154 are axially reciprocatingly and sealingly moveable relative to both the main piston 152 and the cover shell 20 of the casing 12. The first and second piston sealing members 85 and 87, mounted to a radially outer peripheral surface of each of the secondary pistons 54, creates a seal at the interface of the main piston 52 and each of the secondary pistons 54. Similarly, the cylindrical outer surface $159_2$ of each of the bosses 158 is formed with an annular groove 153 formed in the boss 158 of each of the main piston 152, for example, by machining or casting. An annular second piston sealing member (e.g., O-ring) 161 is disposed in the annular groove 153. Thus, each of the secondary pistons 154 is sealed within one of the bosses 158 of the main piston 152 by the first piston sealing member 185, and the main piston 152 is sealed within one of the piston cups 80 of the cover shell 20 by the second piston sealing member 161. According to the second exemplary embodiment of the present invention, the secondary pistons 154 are axially reciprocatingly and sealingly moveable relative to both the main piston 152, while the main piston 152 is axially reciprocatingly and sealingly moveable relative to the cover shell 20 of the casing 12. The first piston sealing member 185, mounted to a radially outer peripheral surface of each of the secondary pistons 154, creates a seal at the interface of the main piston 152 and each of the secondary pistons 54, while the second piston sealing member 161, mounted to a radially outer peripheral surface of each of the bosses 158 of the main piston 152, creates a seal at the interface of the main piston 152 and each of the piston cups 80 of the cover shell 20.

Moreover, each of the secondary pistons 154 is axially biased by at least one compression spring (such as a coil spring) 78 away from the cover shell 20 of the casing 12, as best shown in FIG. 16. The compression spring 78 is disposed within the hollow chamber 173 of the secondary piston 154 between the head member 170 of the secondary piston 154 and a radial wall 82 of the piston cup 80 of the cover shell 20. A free distal end 175 of the piston rod 174 is provided with a snap ring 76, disposed outside of the cover shell 20 for limiting axial movement of the secondary piston 154 in the direction toward the turbine wheel 26 and away from the cover shell 20 when the snap ring 76 mounted on the piston rod 174 of the secondary piston 154 engages the radial wall 82 of the piston cup 80 of the cover shell 20.

Each of the secondary pistons 154 is axially moveable relative to the main piston 152 and the piston cup 80 of the cover shell 20 between an extended position and a retracted position with respect to the main piston 152.

The hydrokinetic torque-coupling device 110 in accordance with the present invention has four modes of operation, similar to the hydrokinetic torque-coupling device 10 in accordance with the first exemplary embodiment of the present invention.

Figure 15:
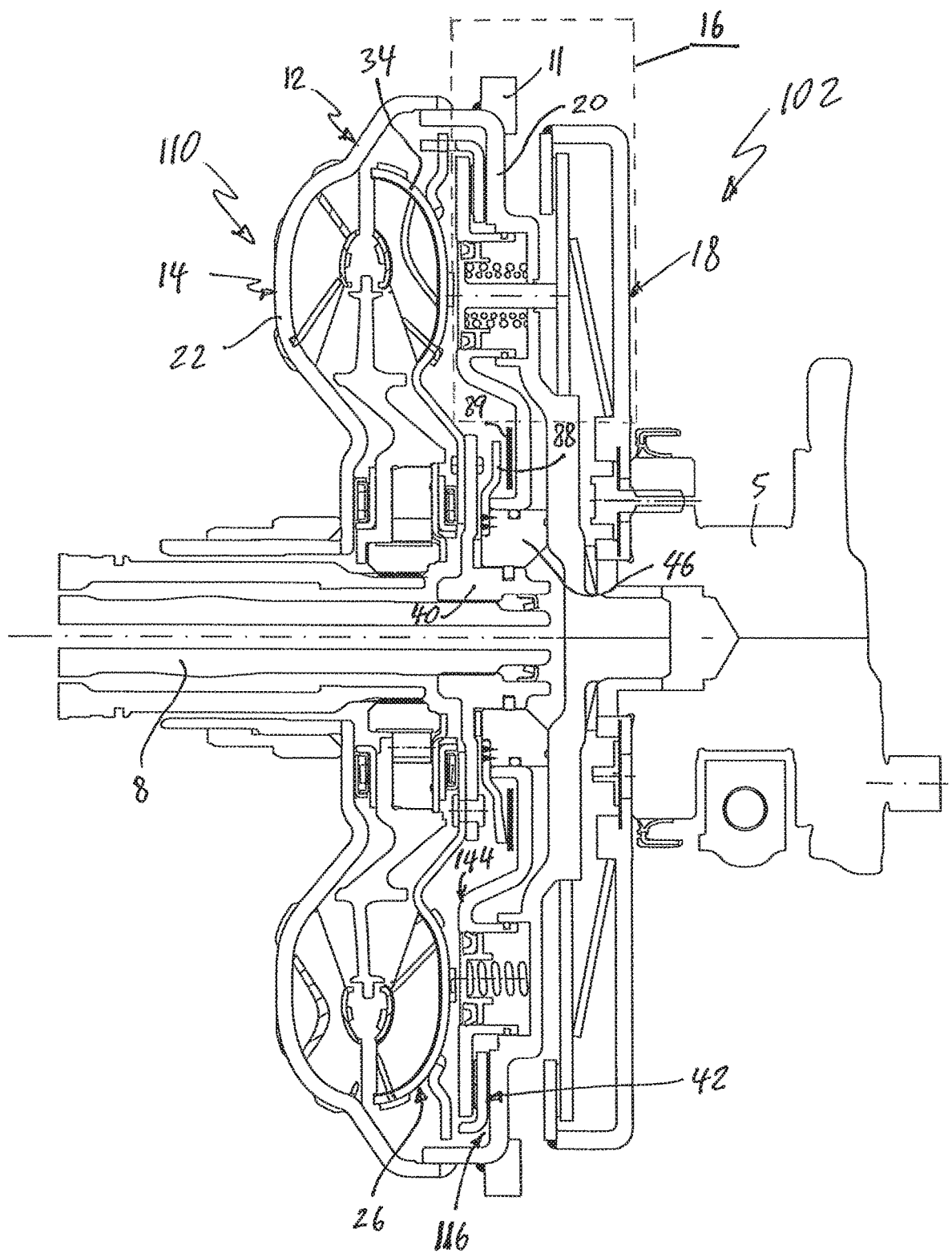
FIG. 15 is a sectional view of a hydrokinetic torque-coupling device in accordance with a second exemplary embodiment of the present invention in a first mode of operation.

In a first mode of operation, illustrated in FIGS. 15 and 16, a release pressure of the lock-up clutch 116 in the release chamber CR is about 500 KPa, while an apply pressure of the lock-up clutch 116 in the apply chamber CA is about 200 KPa. Consequently, the main piston 152 is in the non-lockup position and the secondary pistons 154 are in the extended position, in which both the main piston 152 and the secondary pistons 154 are spaced from the cover shell 20 to maximum distance, wherein the friction ring 42 does not frictionally engage the locking surface 12e of the cover shell 20 of the casing 12 by the main piston 152 (i.e., the non-lockup position of the lock-up clutch 116), and the output member 93 of the selective clutch 18 is in the engaged position. In the first mode of operation, the main piston 152 is axially spaced from the friction ring 42, and the torque-coupling device 110 is in a hydrodynamic mode with the ICE 4 drivingly coupled thereto.

In a second mode of operation, the apply pressure of the lock-up clutch 116 in the apply chamber CA is between 0-500 KPa, preferably between 100-500 KPa. Consequently, the main piston 152 moves toward the cover shell 20 against resilient forces of the tongues 89 to the lockup position, in which the main piston 152 presses against the friction portion 48 of the friction ring 42 to frictionally non-rotatably engage the friction ring 42 against the locking surface 12e of the cover shell 20 of the casing 12 (i.e., the lockup position of the lock-up clutch 116). The secondary pistons 154 remain in the extended position, in which the output member 93 of the selective clutch 18 is in the engaged position. In the second mode of operation, the ICE 4 and the transmission shaft 8 are directly connected. In the second mode of operation a battery of the hybrid vehicle may be in a charging mode.

In a third mode of operation, the apply pressure of the lock-up clutch 116 in the apply chamber CA is between 500-800 KPa. Consequently, the secondary pistons 154 move rightward in the direction toward the cover shell 20 of the casing 12 and the selective clutch 18 to the retracted position thereof and place the selective clutch 18 in the disengaged position. Specifically, the free distal end 175 of the piston rod 174 pushes the friction disc 94 of the output member 93 away from the friction surface 92e of the friction plate 92 of the clutch casing 91 against the resilient force of the spring member 97, and places the selective clutch 18 in the disengaged position. The main piston 152 remains in the lockup position. In the third mode of operation, the ICE 4 and transmission shaft 8 are disconnected, while the electric machine 6 and the transmission shaft 8 are directly connected. The ICE 4 may off. The hybrid vehicle is in re-generation mode or an electric-drive (or E-drive) mode.

In a fourth mode of operation, the release pressure of the lock-up clutch 116 in the release chamber CR is about 800 KPa, and the apply pressure of the lock-up clutch 116 in the apply chamber CA is also about 800 KPa. Consequently, the secondary pistons 154 remain in the retracted position thereof and maintain the selective clutch 18 in the disengaged position. However, the main piston 152 moves away from the cover shell 20 of the casing 12 to the non-lockup position of the lock-up clutch 16. In the fourth mode of operation, the ICE 4 is on and ready to switch to the first mode of operation.

In a hydrokinetic torque-coupling device 210 of a third exemplary embodiment illustrated in FIGS. 20-27, the dual piston assembly 44 of the torque-coupling device 10 is replaced by a dual piston assembly 244 of the torque-coupling device 210. The hydrokinetic torque-coupling device 210 of FIGS. 20-27 corresponds substantially to the hydrokinetic torque-coupling device 10 of FIGS. 1-14, and portions of the dual piston assembly 244 which differ will be explained in detail below.

Figure 20:
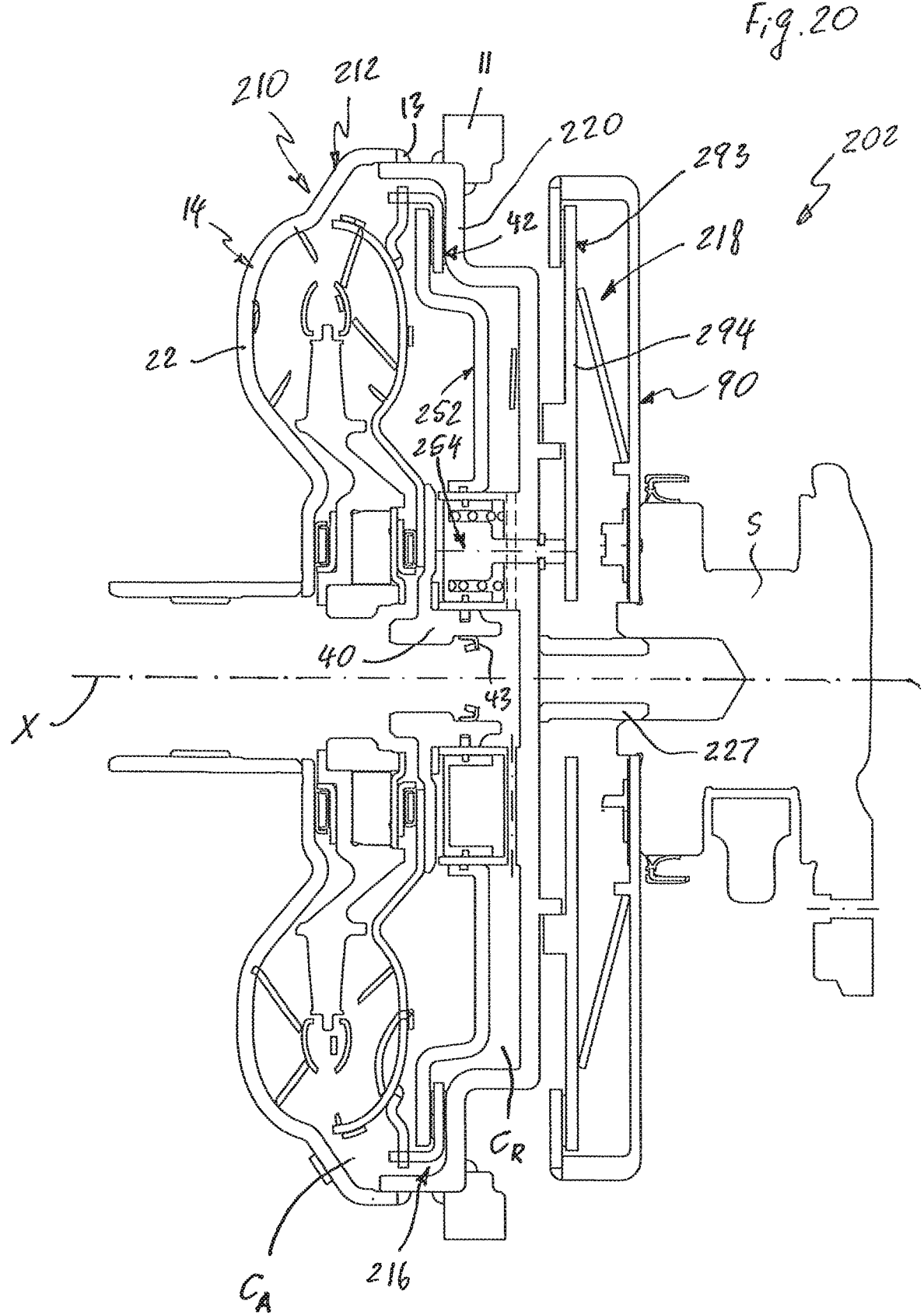
FIG. 20 is a sectional view of a hydrokinetic torque-coupling device in accordance with a third exemplary embodiment of the present invention in a first mode of operation.

The hydrokinetic torque-coupling device 210 comprises a sealed casing 212 filled with a fluid, such as oil or transmission fluid, and rotatable about a rotational axis X, a hydrokinetic torque converter 14, a lock-up clutch 216, and a selective clutch 218. As best shown in FIG. 20, the lock-up clutch 126 is disposed in the casing 212, while the selective clutch 218 is disposed outside of the casing 212. The sealed casing 212, the torque converter 14, the lock-up clutch 216 and the selective clutch 218 are all rotatable about the rotational axis X.

The sealed casing 212 according to the third exemplary embodiment as illustrated in FIG. 20 includes a first shell (or cover shell) 220, and a second shell (or impeller shell) 22 disposed coaxially with and axially opposite to the cover shell 220. The first and second shells 220, 22 are non-movably (i.e., fixedly) interconnected and sealed together about their outer peripheries, such as by weld 13. Each of the first and second shells 220, 22 are integral or one-piece and may be made, for example, by press-forming one-piece metal sheets.

The cover shell 220 is selectively drivingly connectable to the driving shaft, typically to the output shaft 5 of the ICE 4 through the selective clutch 218. Specifically, in the illustrated embodiment of FIG. 20, the casing 212 is selectively rotatably driven by the ICE 4 and is selectively drivingly coupled to the driving shaft 5 through the selective clutch 218.

Figure 21:
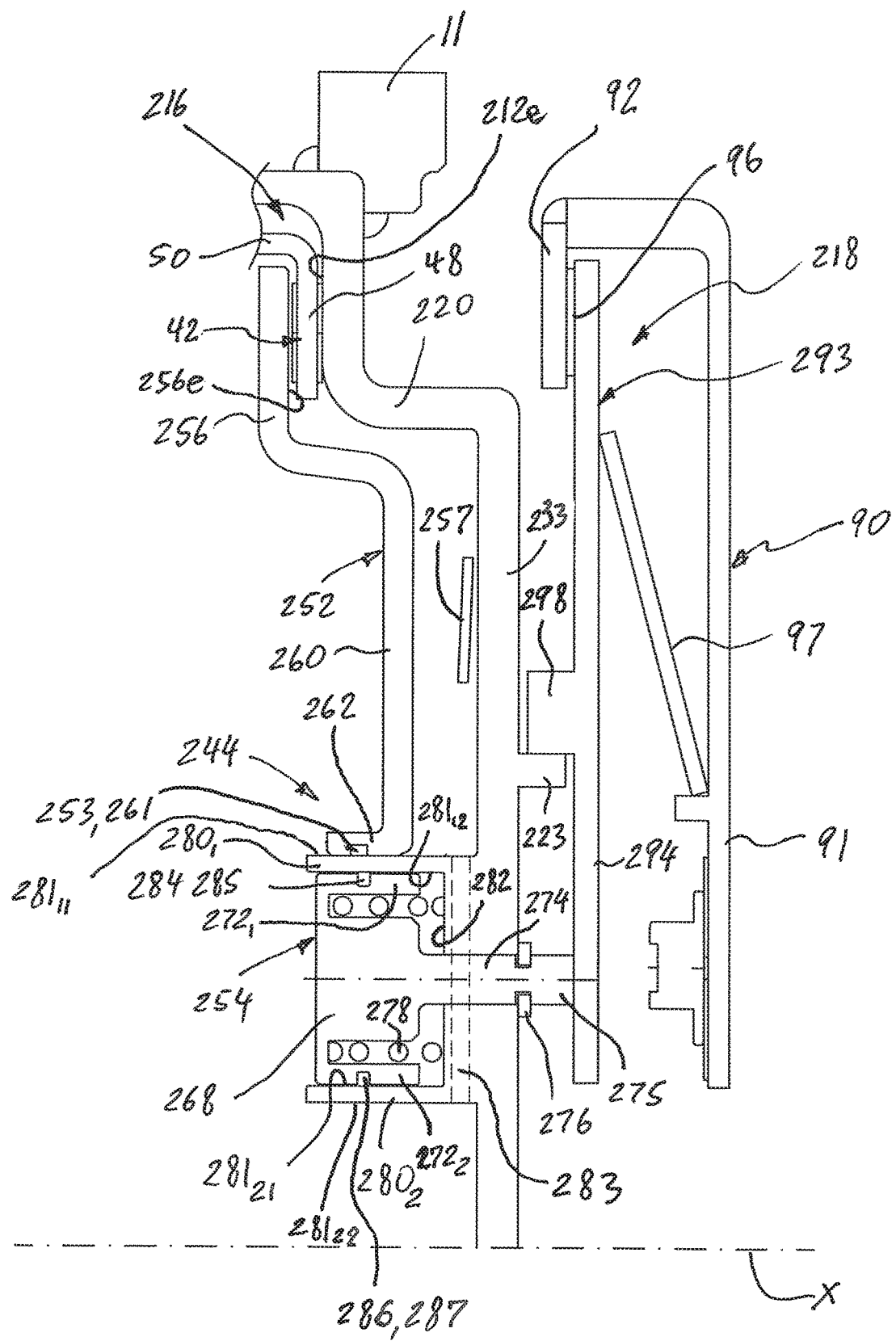
FIG. 21 is an enlarged view of a fragment of the hydrokinetic torque-coupling device of FIG. 20 partially showing a lock-up clutch and a selective clutch.
Figure 24:
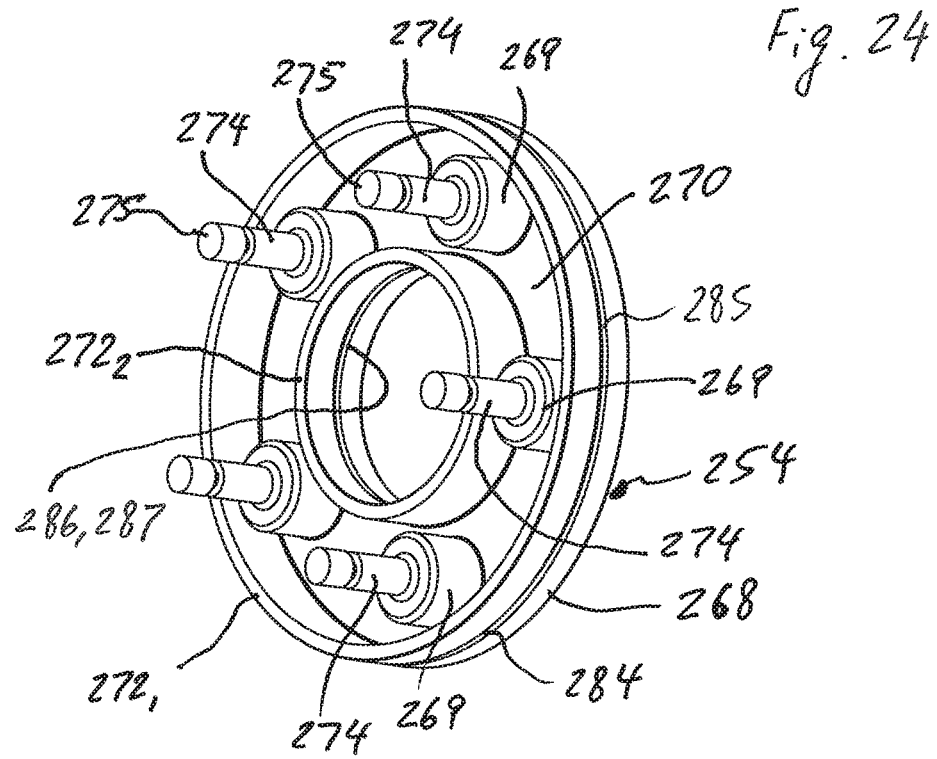
FIG. 24 is a perspective view of a cylindrical hollow body of the secondary piston of the dual piston assembly in accordance with the third exemplary embodiment of the present invention.
Figure 23:
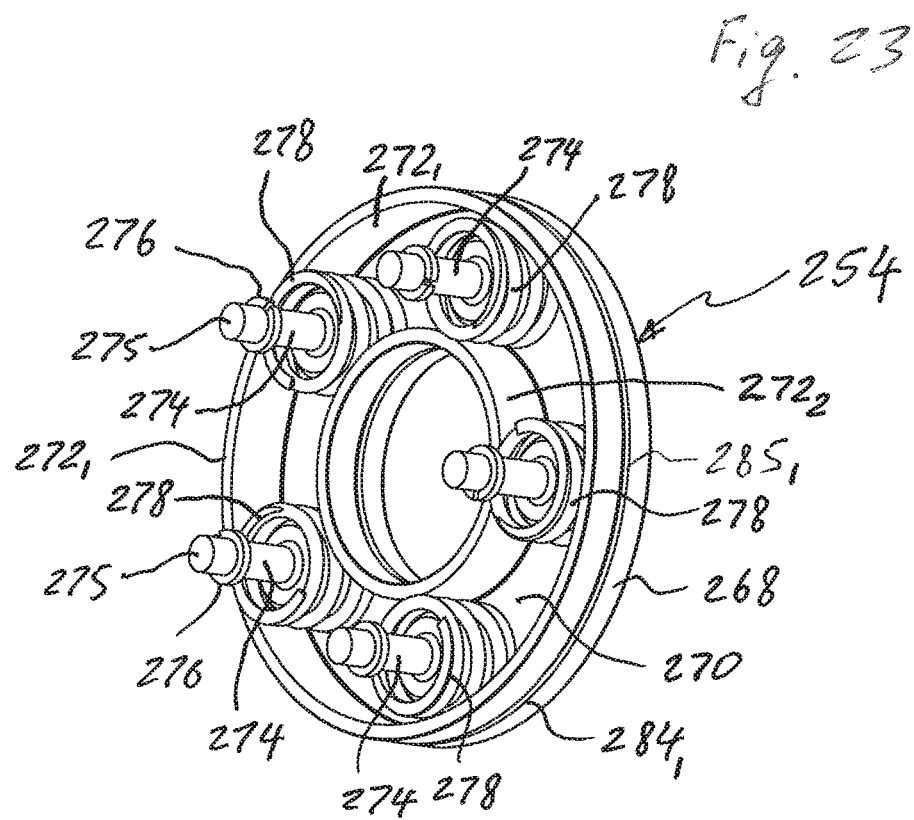
FIG. 23 is a perspective view of a secondary piston of the dual piston assembly in accordance with the third exemplary embodiment of the present invention.

The lock-up clutch 216 of the torque-coupling device 210 includes a friction ring 42, and a dual piston assembly 244, both axially movable to and from the cover shell 220. The friction ring 42 is axially moveable relative to the casing 12 along the rotational axis X to and from a locking (or inner engagement) surface 212e defined on the cover shell 220 of the casing 212, as best shown in FIG. 21. The friction ring 42 is configured to selectively frictionally engage the locking surface 212e of the cover shell 220 of the casing 212. The friction ring 42 is disposed axially between the dual piston assembly 244 and the cover shell 220.

The dual piston assembly 244 includes an annular main (or first) piston 252 as best shown in FIG. 2 axially movable to and from the cover shell 220, and a single secondary (or second) piston 254 mounted to the cover shell 220 and axially moveable relative to the cover shell 220 and the main piston 252. The friction portion 48 of the friction ring 42 is disposed axially between the main piston 252 and the locking surface 212e of the cover shell 220.

The main piston 252 includes a radially oriented annular piston body 256, and an annular hub portion 260 having a cylindrical flange 262 that is proximate to the rotational axis X relative to the annular piston body 256 of the main piston 252. The cylindrical flange 262 of the hub portion 260 of the main piston 252 extends axially at a radially inner peripheral end of the hub portion 260 toward the turbine wheel 26. Moreover, the main piston 252 is normally axially biased by spring arms (or offset leaf springs) 257 away from the cover shell 220 of the casing 212. As best shown in FIG. 20, the spring arms 257, having axially offset distal ends, are disposed inside the casing 212 between the hub portion 260 of the main piston 252 and a radial wall 233 of the cover shell 220. As best shown in FIG. 22, one of the distal ends of each of the spring arms 257 is fixed to the hub portion 260 of the main piston 252, such as by spot welding, adhesive bonding, etc.

Figure 25:
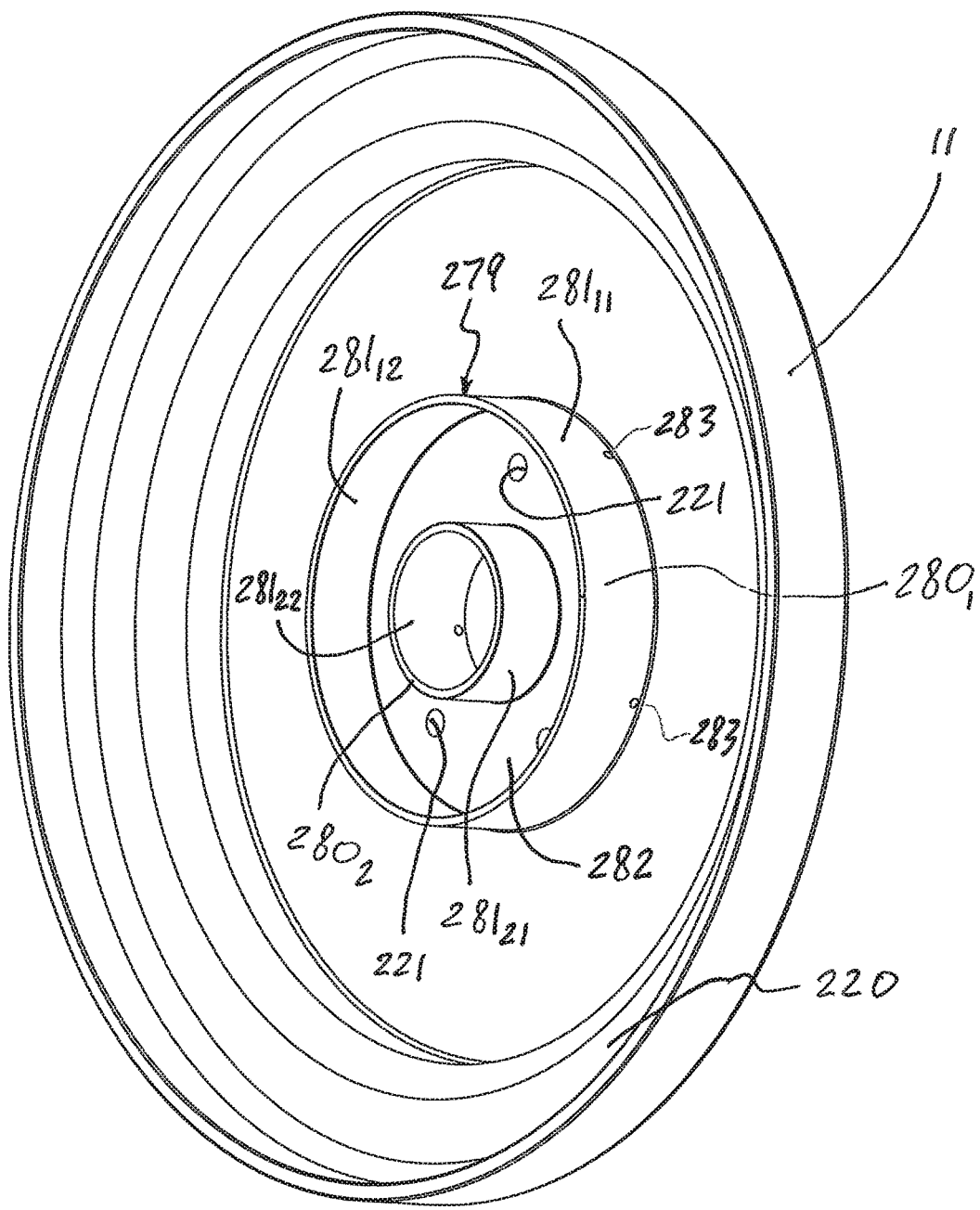
FIG. 25 is a perspective view from inside of a cover shell of a casing of the hydrokinetic torque-coupling device in accordance with the third exemplary embodiment of the present invention.

Furthermore, the cover shell 220 of the casing 212 includes an annular piston cylinder 279 formed by an annular radially outer piston flange $280_1$ and an annular radially inner piston flange $280_2$, both axially protruding toward the main piston 252 and formed integrally with the cover shell 220 of the casing 212. Together, the outer piston flange $280_1$, the inner piston flange $280_2$ and an axially inner surface 282 of the radial wall 233 of the cover shell 220 form the annular piston cylinder 279 (best shown in FIG. 25) slidingly receiving the secondary piston 254 therein. The radially outer piston flange $280_1$ has a cylindrical radially outer peripheral surface $281_{11}$ and a cylindrical radially inner peripheral surface $281_{12}$. Similarly, the inner piston flange $280_2$ has a cylindrical radially outer peripheral surface $281_{21}$ and a cylindrical radially inner peripheral surface $281_{22}$. One or more communication channels 283 radially extend through the radial wall 233 of the cover shell 220, as best shown in FIGS. 21 and 25, for fluidly connecting the release chamber CR with a space radially below the radially inner piston flange $280_2$ of the piston cylinder 279.

In the third exemplary embodiment of the present invention illustrated in FIGS. 20-27, the main piston 252 is axially slidably mounted on the outer peripheral surface $281_{11}$ of the radially outer piston flange $280_1$ of the piston cylinder 279 between a lockup position and a non-lockup position of the lockup clutch 216.

The secondary piston 254 of the third exemplary embodiment of the present invention includes a cylindrical hollow body 268 having a head plate (or head member) 270, a radially outer cylindrical skirt $272_1$ and a radially inner cylindrical skirt $272_2$ radially spaced from the radially outer cylindrical skirt $272_1$. Both the radially outer cylindrical skirt $272_1$ and the radially inner cylindrical skirt $272_2$ axially extend from the head plate 270 of the secondary piston 254 in the direction toward the axially inner surface 282 of the piston cylinder 279.

The secondary piston 254 further includes a plurality of cylindrical spring support bodies 269 and piston rods 274 each axially extending from one of the spring support bodies 269 through the annular piston cylinder 279, as best shown in FIG. 21. The spring support bodies 269 are equiangularly and equidistantly spaced from each other. A free distal end 275 of each of the piston rods 274 is provided with a snap ring 276, disposed outside of the cover shell 220 for limiting axial movement of the secondary piston 254 in the direction toward the turbine wheel 26 and away from the cover shell 220 when the snap rings 276 mounted on the piston rods 274 of the secondary piston 254 engages the radial wall 233 of the cover shell 220. The free distal end 275 of each of the piston rods 274 of the secondary piston 254 axially extends through one of holes 221 extending through the radial wall 233 of the cover shell 220, as best shown in FIG. 21. The secondary piston 254 with the spring support bodies 269 and the piston rods 274 is an integral (or unitary) component, e.g., made of a single part, for example, by casting or machining, or includes separate components fixedly connected together.

The annular secondary piston 254 is axially slidably mounted within the piston cylinder 279 of the cover shell 220 of the casing 212, as best shown in FIGS. 20 and 21, between an extended position and a retracted position with respect to the main piston 252 and the piston cylinder 279 of the cover shell 220. Moreover, the secondary piston 254 is axially biased by at least one compression spring (such as a coil spring) 278 away from the axially inner surface 282 of the piston cylinder 279, or from the cover shell 220 of the casing 212, as best shown in FIG. 2. The compression spring 278 is disposed within the secondary piston 254 axially between the head plate 270 of the secondary piston 254 and the axially inner surface 282 of the piston cylinder 279 of the cover shell 220.

The radially outer cylindrical skirt $272_1$ of the secondary piston 254 has a first annular groove 284 facing the cylindrical radially inner peripheral surface $281_{12}$ of the radially outer piston flange $280_1$ of the piston cylinder 279, while the radially inner cylindrical skirt $272_2$ of the secondary piston 254 has a second annular groove 286 facing the cylindrical radially outer peripheral surface $281_{21}$ of the radially inner piston flange $280_2$ of the piston cylinder 279. The first and second annular grooves 284 and 286, respectively, are formed in the outer and inner cylindrical skirts $272_1$ and $272_2$ of the secondary piston 254, for example, by machining or casting. An annular first piston sealing member 285 is disposed in the first annular groove 284, and an annular second piston sealing member 287 is disposed in the second annular groove 286. The secondary piston 254 is sealed within the piston cylinder 279 by the first and second piston sealing members 285 and 287, respectively. The sealing members 285, 287 are preferably O-rings. According to the third exemplary embodiment of the present invention, the secondary piston 254 is axially reciprocatingly and sealingly moveable relative to the piston cylinder 279 of the cover shell 220 of the casing 212. The first and second piston sealing members 285 and 287 create a seal at the interface of the piston cylinder 279 and the secondary piston 254.

A cylindrical radially inner surface of the cylindrical flange 262 of the main piston 252 is formed with an annular groove 253, for example, by machining or casting. An annular main piston sealing member (e.g., O-ring) 261 is disposed in the annular groove 253. Thus, the main piston 252 is sealed on the radially outer piston flange $280_1$ of the piston cylinder 279 by the main piston sealing member 261, and the main piston 252 is sealed on the piston cylinder 279 of the cover shell 220 by the main piston sealing member 161.

The selective clutch 218 is disposed outside of the casing 212 between the output shaft 5 of the ICE 4 and the cover shell 220 of the casing 212. The selective clutch 218 includes an input member 90, an output member 293 drivingly and non-rotatably connectable to the input member 90, and a spring member 97 disposed between the input member 90 and the output member 293 of the selective clutch 218.

The input member 90 includes a clutch casing 91 including a generally radially orientated annular friction plate 92. The annular friction plate 92 defines a friction surface 92e facing the output member 93, as best shown in FIG. 21. The output member 293 includes a friction disc 294 and an annular friction liner 96 attached to the friction disc 294, such as by adhesive bonding, so as to axially face the friction surface 92e of the clutch casing 91, as best shown in FIG. 21.

The clutch casing 91 of the input member 90 is rotatably mounted to a central boss 227 of the cover shell 220, while non-ratably coupled (preferably, non-moveably secured by fasteners) to the crankshaft 5 of the ICE 4, as best shown in FIG. 20. According to the third exemplary embodiment, the clutch casing 91 of the input member 90 is non-moveably secured to the crankshaft 5 of the ICE 4.

Figure 26:
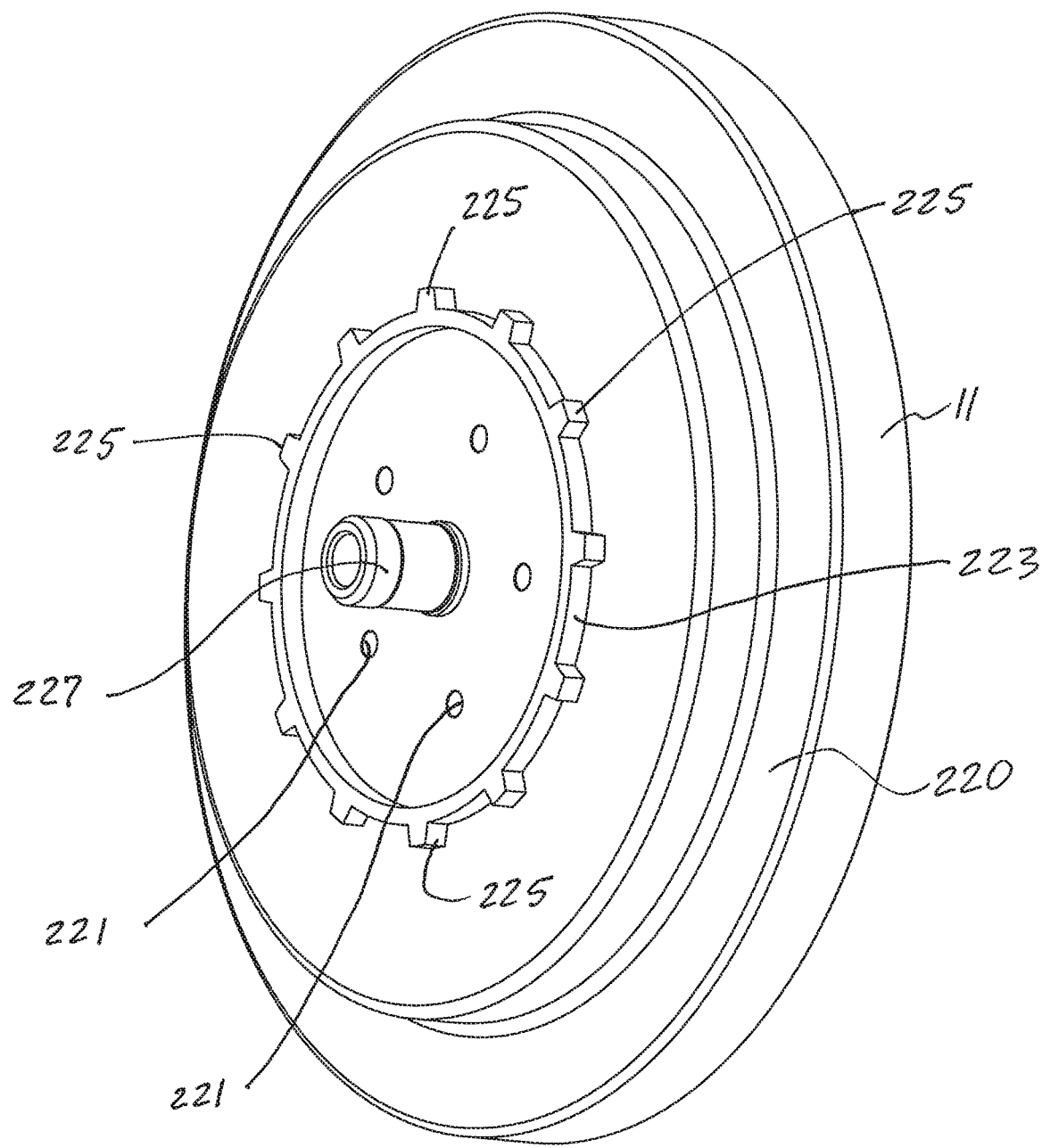
FIG. 26 is a perspective view from outside of the cover shell of the casing of the hydrokinetic torque-coupling device in accordance with the third exemplary embodiment of the present invention.

As illustrated in FIG. 27, the friction disc 294 of the output member 293 is provided with one or more grooves 295 formed on a radially inner surface of a drive ring 298. According to the third exemplary embodiment, the drive ring 298 is an integral (or unitary) part of the friction disc 294, e.g., made of a single or unitary component, but may be separate components fixedly connected together. The drive ring 298 of the output member 293 according to the third exemplary embodiment of the present invention has a plurality of the grooves 295, as best illustrated in FIG. 27. The grooves 295 are equiangularly and equidistantly spaced from each other. Preferably, the grooves 295 are machined on the drive ring 298. Moreover, as best shown in FIG. 26, the cover shell 220 of the casing 212 is provided with one or more teeth 225 formed on a support boss 223 thereof. Moreover, the teeth 225 are equiangularly and equidistantly spaced from each other. The cover shell 220 with the support boss 223 and the teeth 225 is an integral (or unitary) part, e.g., made of a single or unitary component, but may be separate components fixedly connected together. Preferably, the teeth 225 are machined on the support boss 223 of the cover shell 220. The grooves 295 are complementary to the teeth 225 of the cover shell 220 and are configured to slideably mesh with the teeth 225 so as to non-rotatably couple the output member 293 of the selective clutch 218 relative to the cover shell 220 of the casing 212, but permit axial displacement of the output member 293 relative to the cover shell 220.

The output member 293 of the selective clutch 18 is selectively axially moveable relative to the input member 90 between an engaged position and a disengaged position. In the engaged position of the selective clutch 218, shown in FIGS. 20 and 21, the output shaft 5 of the ICE 4 is non-rotatably coupled to the casing 212 through the selective clutch 218 acting as a one-way clutch that permits transmission of the drive torque from the output shaft 5 of the ICE 4 to the casing 212 in one direction only, specifically from the ICE 4 to the casing 212, but not from the casing 212 to the ICE 4. In the disengaged position of the selective clutch 218, the output shaft 5 of the ICE 4 is drivingly disconnected from the casing 212.

The spring member 97 of the selective clutch 218 is preferably a disc spring. Those skilled in the art understand that other appropriate springs are within the scope of the present invention. As best shown in FIG. 21, the spring member 97 biases the output member 293 toward the engaged position. Moreover, a rate of the spring member 97 is such that the output member 293 non-rotatably engages the friction plate 92 of the clutch casing 91 in the engaged position of the selective clutch 218, thus non-rotatably coupling the casing 212 of the hydrokinetic torque-coupling device 210 to the output shaft 5 of the ICE 4. As best shown in FIG. 21, the free distal ends 275 of the piston rods 274 of the secondary piston 254 engage (i.e., is in contact with) the friction disc 294 of the output member 293.

The hydrokinetic torque-coupling device 210 in accordance with the present invention has four modes of operation.

In a first mode of operation, illustrated in FIGS. 20 and 21, a release pressure of the lock-up clutch 216 in the release chamber CR is about 500 KPa, while an apply pressure of the lock-up clutch 16 in the apply chamber CA is about 200 KPa. Consequently, the main piston 252 is in the non-lockup position and the secondary piston 254 is in the extended position, in which both the main piston 252 and the secondary piston 254 are spaced from the cover shell 220 a maximum distance, wherein the friction ring 42 does not frictionally engage the locking surface 212e of the cover shell 220 of the casing 212 by the main piston 252 (i.e., the non-lockup position of the lock-up clutch 216), and the output member 293 of the selective clutch 218 is in the engaged position thereof. In the first mode of operation, the main piston 252 is axially spaced from the friction ring 42, and the torque-coupling device 210 is in a hydrodynamic mode with the ICE 4 drivingly coupled thereto.

In a second mode of operation, the apply pressure of the lock-up clutch 216 in the apply chamber CA is between 0-500 KPa, preferably between 100-500 KPa. Consequently, the main piston 252 moves toward the cover shell 220 against a resilient force of the spring arms 257 to the lockup position, in which the main piston 252 presses against the friction portion 48 of the friction ring 42 to frictionally non-rotatably engage the friction ring 42 against the locking surface 212e of the cover shell 220 of the casing 212 (i.e., the lockup position of the lock-up clutch 216). The secondary piston 254 remains in the extended position thereof, in which the output member 293 of the selective clutch 218 is in the engaged position. In the second mode of operation, the ICE 4 and the transmission shaft 8 are directly connected. In the second mode of operation a battery of the hybrid vehicle may be in charging mode.

In a third mode of operation, the apply pressure of the lock-up clutch 216 in the apply chamber CA is between 500-800 KPa. Consequently, the secondary piston 254 moves rightward in the direction toward the cover shell 220 of the casing 212 and the selective clutch 218 to the retracted position thereof and places the selective clutch 218 in the disengaged position. Specifically, the free distal ends 275 of the piston rods 274 of the secondary piston 254 push the friction disc 294 of the output member 293 away from the friction surface 92e of the friction plate 92 of the clutch casing 91 against a resilient force of the spring member 97, and place the selective clutch 218 in the disengaged position. The main piston 252 remains in the lockup position. In the third mode of operation, the ICE 4 and transmission shaft 8 are disconnected, while the electric machine 6 and the transmission shaft 8 are directly connected. The ICE 4 is off. The hybrid vehicle is in re-generation mode or an electric-drive (or E-drive) mode.

In a fourth mode of operation, the release pressure of the lock-up clutch 16 in the release chamber CR is about 800 KPa, and the apply pressure of the lock-up clutch 216 in the apply chamber CA is also about 800 KPa. Consequently, the secondary piston 254 remains in the retracted position and maintains the selective clutch 218 in the disengaged position. However, the main piston 52 moves leftward (as illustrated in FIGS. 20-21) away from the cover shell 220 of the casing 212 to the non-lockup position of the lock-up clutch 216. In the fourth mode of operation, the ICE 4 is on and ready to switch to the first mode of operation.

The foregoing description of the exemplary embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque-coupling device for a hybrid electric vehicle, comprising:
    a casing rotatable about a rotational axis;
    a torque converter including an impeller wheel and a turbine wheel disposed in the casing coaxially with the impeller wheel;
    a lockup clutch including a dual piston assembly and being switchable between a hydrodynamic transmission mode, in which the turbine wheel is rotatable relative to the casing, and a lockup mode, in which the turbine wheel is non-rotatably coupled to the casing; and
    a selective clutch disposed outside of the casing, the selective clutch including an input member and an output member non-rotatably mounted to the casing;
    the dual piston assembly including a main piston and at least one secondary piston mounted to the main piston and axially moveable relative to the main piston and the casing;
    the main piston of the dual piston assembly selectively axially moveable relative to the casing and the at least one secondary piston between a lockup position, in which the main piston is non-rotatably coupled to the casing, and a non-lockup position, in which the main piston is rotatable relative to the casing;
    the output member selectively axially moveable relative to the input member between an engaged position, in which the output member is non-rotatably coupled to the input member of the selective clutch, and a disengaged position, in which the output member is rotatable relative to the input member of the selective clutch;
    the output member selectively axially moveable from the engaged position to the disengaged position of the selective clutch by action of the at least one secondary piston.

2. The hydrokinetic torque-coupling device as defined in claim 1, wherein the casing includes a cover shell and an impeller shell disposed coaxially with and axially opposite to the cover shell, and wherein the cover shell and the impeller shell are non-movably connected to one another.

3. The hydrokinetic torque-coupling device as defined in claim 2, wherein the output member of the selective clutch is non-rotatably connected to the cover shell of the casing, and wherein the input member is rotatable relative to the casing.

4. The hydrokinetic torque coupling device as defined in claim 3, wherein the output member of the selective clutch is axially moveable relative to the cover shell of the casing.

5. The hydrokinetic torque coupling device as defined in claim 4, wherein the output member of the selective clutch is axially biased toward the engaged position thereof so that the output member non-rotatably engages the input member of the selective clutch by a spring member.

6. The hydrokinetic torque coupling device as defined in claim 5, wherein the input member of the selective clutch includes a clutch casing having a friction plate forming a friction surface facing the output member of the selective clutch, and wherein the output member of the selective clutch includes a friction disc axially facing the friction surface of the clutch casing.

7. The hydrokinetic torque coupling device as defined in claim 6, wherein the friction disc of the selective clutch is axially biased toward the friction surface the friction plate of the clutch casing of the selective clutch by the spring member such that in the engaged position of the output member of the selective clutch the friction disc of the output member non-rotatably engages the friction plate of the clutch casing of the selective clutch.

8. The hydrokinetic torque-coupling device as defined in claim 2, wherein the main piston includes a radially oriented annular piston body and an annular hub portion having a cylindrical flange, and wherein the at least one secondary piston includes a head member, a cylindrical skirt defining a hollow chamber within the at least one secondary piston, and a piston rod axially extending from the head member through the main piston and through the cover shell of the casing.

9. The hydrokinetic torque-coupling device as defined in claim 2, wherein the main piston is axially biased away from the cover shell of the casing.

10. The hydrokinetic torque-coupling device as defined in claim 2, wherein the at least one secondary piston is axially biased away from the cover shell of the casing by at least one compression spring.

11. The hydrokinetic torque-coupling device as defined in claim 2, wherein the at least one secondary piston is mounted to the main piston and is axially moveable relative thereto and the cover shell of the casing.

12. The hydrokinetic torque-coupling device as defined in claim 11, wherein the main piston includes a radially oriented annular piston body and at least one axially protruding boss receiving the at least one secondary piston therein so that the at least one secondary piston is axially moveable relative the at least one boss of the main piston and the cover shell.

13. The hydrokinetic torque coupling device as defined in claim 2, wherein the at least one secondary piston includes a plurality of secondary pistons spaced circumferentially equidistantly from one another around the rotational axis, and wherein each of the secondary pistons is moveable relative the main piston and the cover shell.

14. The hydrokinetic torque coupling device as defined in claim 2, wherein the at least one secondary piston is a single annular secondary piston mounted to the cover shell of the casing coaxially with the main piston and axially moveable relative the main piston and the cover shell.

15. The hydrokinetic torque-coupling device as defined in claim 1, wherein the at least one secondary piston includes a head member, a cylindrical skirt defining a hollow chamber within the at least one secondary piston, and a piston rod axially extending from the head member through the main piston and through the cover shell of the casing.

16. The hydrokinetic torque-coupling device as defined in claim 15, wherein the at least one secondary piston has a first piston sealing member disposed on the cylindrical skirt of the at least one secondary piston between the at least one boss of the main piston and the cylindrical skirt of the at least one secondary piston.

17. The hydrokinetic torque-coupling device as defined in claim 15, wherein the cover shell of the casing includes at least one axially protruding piston cup formed integrally with the cover shell of the casing and receiving the at least one secondary piston therein so that the at least one secondary piston is axially moveable relative the at least one boss of the main piston and the at least one piston cup of cover shell.

18. The hydrokinetic torque-coupling device as defined in claim 17, wherein the at least one secondary piston has a second piston sealing member disposed on the cylindrical skirt of the at least one secondary piston between the least one piston cup of cover shell and the cylindrical skirt of the at least one secondary piston.

19. The hydrokinetic torque-coupling device as defined in claim 15, wherein the cover shell of the casing includes at least one axially protruding piston cup formed integrally with the cover shell of the casing and receiving the at least one boss of the main piston therein so that the at least one boss of the main piston is axially moveable relative the at least one piston cup of the cover shell of the casing.

20. The hydrokinetic torque-coupling device as defined in claim 19, wherein the at least one secondary piston has a first piston sealing member disposed on the cylindrical skirt of the at least one secondary piston between the at least one boss of the main piston and the cylindrical skirt of the at least one secondary piston.

21. The hydrokinetic torque-coupling device as defined in claim 20, wherein the main piston has at least one second piston sealing member disposed on the at least one boss of the main piston between the least one piston cup of cover shell and the at least one boss of the main piston.

22. A method of operation of a hydrokinetic torque-coupling device for a hybrid electric vehicle comprising an internal combustion engine and an electrical machine, the hydrokinetic torque-coupling device comprising:
   a casing rotatable about a rotational axis and drivingly coupled to the electrical machine;
   a torque converter including an impeller wheel and a turbine wheel disposed in the casing coaxially with the impeller wheel;
   a lockup clutch including a dual piston assembly and being switchable between a hydrodynamic transmission mode, in which the turbine wheel is rotatable relative to the casing, and a lockup mode, in which the turbine wheel is non-rotatably coupled to the casing; and
   a selective clutch disposed outside of the casing, the selective clutch including an input member drivingly coupled to the internal combustion engine and an output member non-rotatably mounted to the casing;
   the dual piston assembly including a main piston and at least one secondary piston mounted to the main piston and axially moveable relative to the main piston and the casing;
   the main piston of the dual piston assembly selectively axially moveable relative to the casing and the at least one secondary piston between a lockup position, in which the main piston is non-rotatably coupled to the casing, and a non-lockup position, in which the main piston is rotatable relative to the casing;
   the output member selectively axially moveable relative to the input member between an engaged position, in which the output member is non-rotatably coupled to the input member of the selective clutch, and a disengaged position, in which the output member is rotatable relative to the input member of the selective clutch;
   the output member selectively axially moveable from the engaged position to the disengaged position of the selective clutch by action of the at least one secondary piston;
   the method comprising the steps of:
selectively controlling axial displacement of the dual lockup piston assembly by regulating hydraulic pressure to the main piston and the at least one secondary piston in order to configure the output member of the selective clutch in a desired one of the engaged position and the disengaged position.

* * * * *